(12) United States Patent
Bosworth et al.

(10) Patent No.: US 10,705,805 B1
(45) Date of Patent: Jul. 7, 2020

(54) APPLICATION AUTHORING USING WEB-OF-SHEETS DATA MODEL

(71) Applicant: Amazon Technologies, Inc., Seattle, WA (US)

(72) Inventors: Adam Bosworth, San Francisco, CA (US); Ian Scott Eslick, San Francisco, CA (US); Tatyana Mamut, San Francisco, CA (US); Joseph Rozenfeld, San Carlos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 15/839,663

(22) Filed: Dec. 12, 2017

(51) Int. Cl.
*G06F 9/44* (2018.01)
*G06F 8/34* (2018.01)
*G06F 40/186* (2020.01)

(52) U.S. Cl.
CPC .............. *G06F 8/34* (2013.01); *G06F 40/186* (2020.01)

(58) Field of Classification Search
CPC .............. G06F 17/246; G06F 17/2288; G06F 16/2329; G06F 8/38
See application file for complete search history.

(56) References Cited

U.S. PATENT DOCUMENTS

| | | |
|---|---|---|
| 5,187,788 A | 2/1993 | Marmelstein |
| 5,255,356 A | 10/1993 | Michelman et al. |
| 5,371,675 A | 12/1994 | Greif et al. |
| 5,499,371 A | 3/1996 | Henninger et al. |
| 5,604,854 A | 2/1997 | Glassey |
| 6,631,497 B1 | 10/2003 | Jamshidi et al. |
| 6,742,175 B1 | 5/2004 | Brassard |
| 6,877,155 B1 | 4/2005 | Lindsey |
| 6,901,579 B1 | 5/2005 | Suguta |
| 6,988,241 B1 | 1/2006 | Guttman et al. |
| 7,032,210 B2 | 4/2006 | Alloing et al. |
| 7,225,189 B1 * | 5/2007 | McCormack ......... G06F 17/246 |
| 7,941,438 B2 | 5/2011 | Molina-Moreno et al. |
| 9,053,083 B2 * | 6/2015 | Waldman ................ G06F 40/18 |
| 9,734,139 B2 * | 8/2017 | Reeves ................. G06F 40/194 |
| 2006/0015805 A1 * | 1/2006 | Humenansky ........ G06F 17/246 715/209 |

(Continued)

OTHER PUBLICATIONS

Google, "IMPORTRANGE—Docs editors Help," downloaded from https://support.google.com/docs/answer/3093340 on Oct. 4, 2017, pp. 1-3.

(Continued)

*Primary Examiner* — Duy Khuong T Nguyen
(74) *Attorney, Agent, or Firm* — Robert C. Kowert; Kowert, Hood, Munyon, Rankin & Goetzel, P.C.

(57) ABSTRACT

Representations of a set of cards are displayed via an application authoring interface. A given card represents one or more screen layouts of an application, and contents of a particular card are based on contents of a data sheet materialized in accordance with a data model which enables automatic instantiation of child data sheets associated with a parent cell within a parent data sheet. In response to detecting an edit operation directed at a particular card, an updated representation of the particular card is displayed at the first application authoring interface, and a screen layout corresponding to the updated representation is rendered at a particular mobile computing device.

20 Claims, 12 Drawing Sheets

(56) References Cited

U.S. PATENT DOCUMENTS

| | | | | |
|---|---|---|---|---|
| 2013/0117651 | A1* | 5/2013 | Waldman | G06F 17/246 715/220 |
| 2014/0136936 | A1* | 5/2014 | Patel | G06F 17/2247 715/212 |
| 2015/0089344 | A1* | 3/2015 | Pickering | G06F 3/04842 715/215 |
| 2015/0142740 | A1* | 5/2015 | Behuria | G06F 16/27 707/634 |
| 2017/0098008 | A1* | 4/2017 | Kemmer | G06F 17/246 |
| 2017/0331915 | A1* | 11/2017 | Jann | H04L 67/2847 |
| 2017/0337233 | A1* | 11/2017 | Fawcett | G06F 16/258 |
| 2018/0107671 | A1* | 4/2018 | Plenos | G05B 23/0272 |
| 2018/0157467 | A1* | 6/2018 | Stachura | G06F 8/30 |

OTHER PUBLICATIONS

Microsoft, "Overview of Excel tables," downloaded from https://support.office.com/en-us/article/Overview-of-Excel-tables-7ab0bb7d-3a9e-4b56-a3c9-6c94334e492c on Oct. 2, 2017, pp. 1-6.

Microsoft, "Work with hyperlinks in Excel," downloaded from https://support.office.com/en-us/article-Work-with-hyperlinks-in-Excel-7fc80d8d-68f9-482f-ab01-584c44d72b3e on Oct. 3, 2017, pp. 1-9.

Lili Mou, et al., "On End-to-End Program Generation from User Intention by Deep Neural Networks," ACM, Oct. 25, 2015, pp. 1-4.

Tao Lei, et al., "From Natural Language Specifications to Program Input Parsers," 2013, In Association for Computational Linguistics (ACL), pp. 1-10, Aug. 2013.

Joel Galenson, et al., "CodeHint: Dynamic and Interactive Synthesis of Code Snippets," ICSE'14, May 31-Jun. 7, 2014, ACM 978-1-4503-2756-5114/05, pp. 653-663.

Amazon web Services, "Amazon Machine Learning, Developer Guide, Version Latest," Copyright © 2017 Amazon Web Services, Inc., pp. 1-153, downloaded Feb. 2, 2017.

"17 Top App Makers to Create Your Own Mobile App—Without a Single Line of Code!," May 16, 2017, downloaded from https://www.websitetooltester.com/en/blog/app-makers/, pp. 1-48.

Mehdi Manshadi, et al., "Integrating Programming by Example and Natural Language Programming," Copyright c 2013, Association for the Advancement of Artificial Intelligence (www.aaai.org), pp. 1-7, Apr. 2013.

U.S. Appl. No. 15/714,466, filed Sep. 25, 2017, Rebecca Buck et al.
U.S. Appl. No. 15/818,677, filed Nov. 20, 2017, Adam Bosworth et al.

* cited by examiner

APPLICATION AUTHORING USING WEB-OF-SHEETS DATA MODEL

BACKGROUND

In recent years, more and more software applications are being run using smart phones and other small-footprint devices, or in cloud-based data centers, thereby reducing the need for application owners to maintain expensive application execution environments at their own premises. As application users get accustomed to easy-to-use applications, the pressure on business organizations and governmental entities to make their products and services accessible via such applications increases. Many non-business activities, such as social gatherings and the like, are also increasingly being organized and managed using phone-based or cloud-based applications.

Large well-financed organizations may be able to hire enough programming staff to develop and maintain the applications for various target environments, or outsource the work of developing and maintaining the applications. However, for a "long tail" of relatively small organizations or individuals, the costs associated with developing full-fledged applications may sometimes be prohibitive. For any given application, several different types of programming skills may be required: for example, front-end or user interface design expertise for various types of devices expected to be used for the application, back-end or database skills, security-related expertise, networking skills and so on may all be essential.

For many small organizations, making their unique service and/or product offerings accessible via easy-to-use applications may potentially lead to substantial increases in market size and/or revenue. Some small business owners may have ideas for several different types of application and channels which they would like to try out for delivering their products or services, but may lack the full depth and breadth of programming skills typically needed to develop the applications themselves. In addition, conventional application development techniques may sometimes involve longer code-build-test-deploy cycle times, which may not work well for some types of business users who wish to try out their ideas for applications. Orchestrating the creation and deployment of such applications may present a non-trivial technical and logistical challenge.

Figure 1:
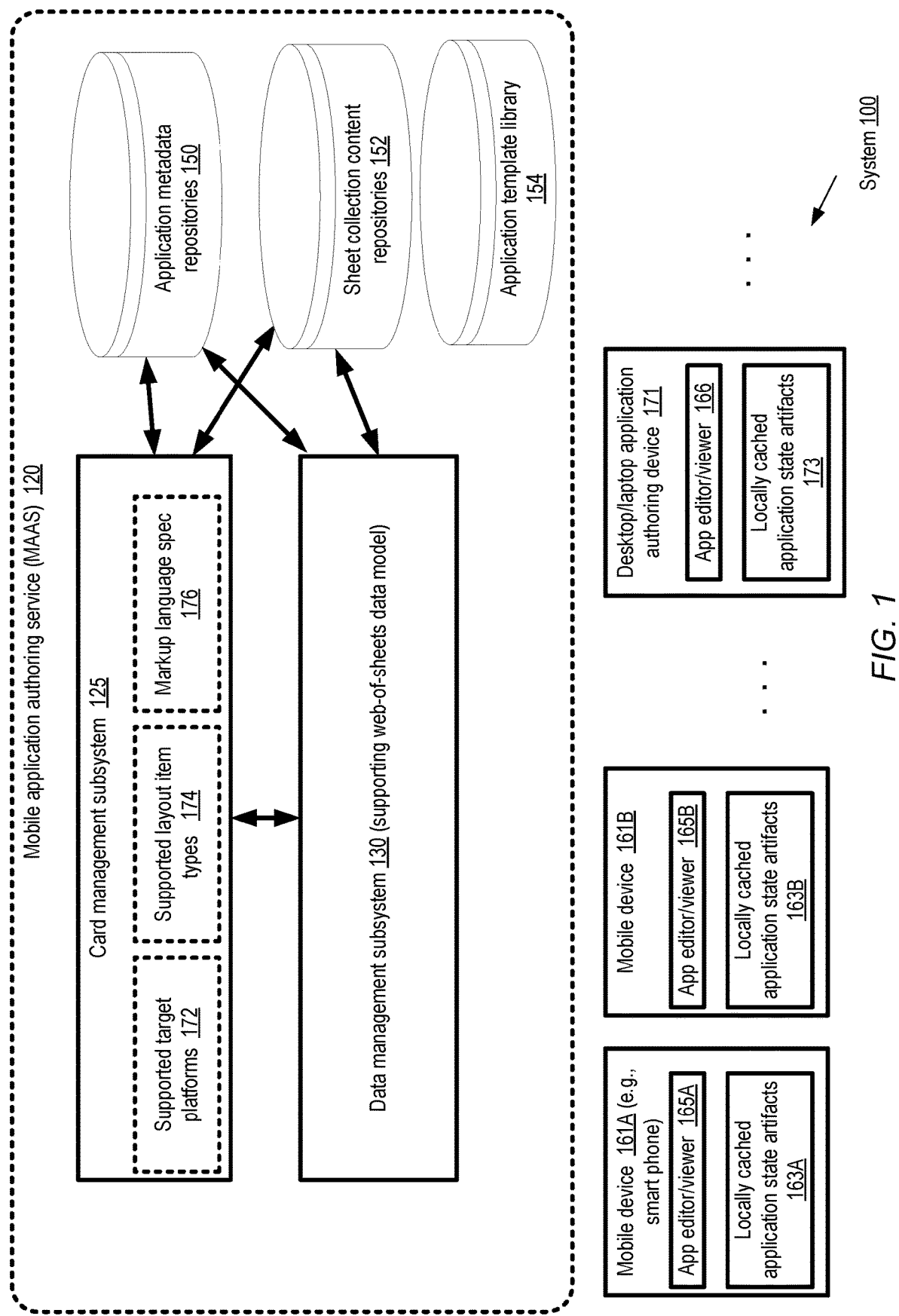
FIG. 1 illustrates an example system environment in which a mobile application authoring service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for facilitating the development or authoring of applications for mobile environments (such as smart phones) and/or web browser-based execution environments using a network-accessible service that supports a "web-of-sheets" model for application data. In the web-of-sheets model, as described below in further detail, data may be stored in logically linkable two-dimensional cell grids or "data sheets", with automatic instantiation of child data sheets to represent hierarchical relationships, as well as the ability to represent invariant associations between proxy cells and groups of other cells. The web-of-sheets model may enable application authors to interact with large amounts of data, with fairly complex logical interrelationships among different subsets of the data, using a familiar spreadsheet-like interface in various embodiments. In at least some embodiments, the data stored using the web-of-sheets model may be linked to, and/or used to populate, layout elements of mobile applications via a "card" abstraction layer. A given card may correspond to one or more screen layouts of the flow of a mobile application in some embodiments, with the mobile application represented as a collection of cards corresponding to successive layouts that may be encountered by an application user as the user interacts with the application. In various embodiments, the mobile application authoring service may provide a set of interfaces that enable live propagation of application updates to subscribed client devices, offline development of applications by various collaborating application authors, automatic application synchronization, local application customization on client devices, intelligent notification management, as well as a variety of analytics capabilities. The terms "developer" and "author" may be used interchangeably in various embodiment to refer to clients of an application authoring service that utilize the service to create, modify and/or deploy applications. In at least some embodiments, the service may simplify the process of application development to such an extent that application users (who may not necessarily be experts in data management or application development) may themselves customize applications or author new applications; as such, the community of potential application authors may be expanded to include non-expert application users in such embodiments.

In various embodiments, application authors utilizing the mobile application authoring service may leverage their existing spreadsheet skills to build simple, collaborative mobile experiences. Authors may easily build screens that provide familiar mobile layout paradigms from simple vertical lists to custom layouts such as calendars, maps, or charts, for example. The information presented in these screens may be linked to data stored in a collection of persistent data sheets using a simple point and click interface in at least some embodiments. In one embodiment, a given card of an application may contain one or more layout elements, and a given layout element may comprise one or more card cells that are in turn linkable to underlying data sheet cells. A rich set of formatting options may be provided in various embodiments that govern how data is displayed and changed. Operations such as uploading a photo or video into a mobile application, linking to web content, and building forms may also be supported in various embodiments. Application authors may add global navigation such as bottom bars, drawers, and menus to mobile applications as desired in various embodiments. Out of the box application-wide styles may be supported in some embodiments, which may be used to personalize the look and feel of an entire application to better match the application's subject matter.

In various embodiments, the interfaces provided by the mobile application authoring service may maintain a pervasive sense of liveness, ensuring that changes in the design of a card or changes to the sheet with which the card is linked are immediately visible and usable from the authoring environment and (if desired) one or more mobile devices. The service may allow authors to use expressions to facilitate authoring dynamic behaviors such as the selection of data to be linked to a card, customization of dynamic user interface elements, and/or data-driven application navigation in at least some embodiments.

In some embodiments, mobile applications may be authored and run in at least two modes: an "online" mode (with connectivity between the authoring service and a mobile device at which the application is being authored or run) and an "offline" mode (without such connectivity). When a mobile application is offline, the functionality of the web-of-sheets model and a locally-cached set of data sheets may remain available to the user or author, allowing them to continue to build applications with logic embedded in the data sheets. Using the locally-cached information, applications of various levels of complexity may be built in at least some embodiments, including for example applications with dashboards that summarize information, as well as dynamic views of lists. When a user or author goes back online, the service may attempt to automatically synchronize the data and the application in various embodiments, e.g., with a master version stored in a repository. If and when merge conflicts occur, in at least some embodiments the service may provide the user or author details regarding the conflicts (e.g., which other entity made conflicting changes and when), and may provide easy default methods to resolve conflicts. In at least some embodiments, users or authors may be provided with reminders when they have unsynchronized data, e.g., using local notifications, to reduce the probability they accidentally lose data or fail to act on unresolved conflicts.

In at least one embodiment, the application authoring service may enable interoperability between mobile applications and processes, other applications or other services running in a cloud environment, e.g., by collaborating via data sheets. For example, in some embodiments processes that push data or their state into a data sheet can be represented via a card, and data updates or new data added by cards to a linked sheet may be used to start, update, or terminate process instances. If and when data for an application eventually grows too large and/or the number of authors or users exceeds a threshold, in some embodiments the application data may be fanned out or distributed among specific users or authors, e.g., using per-user sub-sheets, resulting in reduced conflicts and decreased load time. Such partitioning may be accomplished seamlessly in at least some cases, e.g., via a transformation of simple single-table applications using expressions to navigate into and out of sub-sheets.

According to at least some embodiments, a system may comprise one or more computing devices of an application authoring service, and a repository comprising one or more storage devices. A determination may be made at the service that a particular mobile computing device is to be designated as a live previewing and editing environment for a first mobile application that is being authored. The service may cause respective representations of at least (a) one or more cards and (b) an expanded view of a particular card of the one or more cards to be displayed via a first authoring interface (e.g., an interface implemented at a laptop or desktop computing device). Individual ones of the one or more cards may represent respective sets of one or more screen layouts of the application, and displayed contents of the particular card may be based at least in part on contents of one or more data sheets materialized at the repository in accordance with a web-of-sheets data model. The web-of-sheets data model may enable, in at least some embodiments, (a) automatic instantiation of a child data sheet associated with a parent cell within a parent data sheet and (b) referencing of contents of one or more cells of a particular data sheet via a proxy cell. Thus, for example, a given layout item indicated in a card may be used to display contents of one or more cells of a child sheet, or one or more cells for which a proxy cell has been designated in various embodiments. In response to detecting an edit operation directed at the particular card, the service may store a result of the edit operation at the repository in various embodiments. In addition, in at least some embodiments, an updated representation of the particular card may be displayed at the first authoring interface, and a particular screen layout corresponding to the updated representation may be rendered and displayed (e.g., in real time) at the particular mobile computing device.

The process of authoring a mobile application using the application authoring service may be initiated in a variety of ways. In one embodiment, for example, an application author may submit an application authoring initiation request which indicates a set of one or more data sheets to be used to store the application's data. In response, the service may create an initial or default card to be used for the to-be-developed application, and store metadata records indicating the linkage between the application, the card and the sheets. For example, the metadata records may indicate that the layout represented by the card is to be used for the application, and which cells of the sheets are to be used to populate particular layout elements. In at least some embodiments, the service may provide a set of template applications from which one may be selected by an application author as a starting point for a new application. A given template application may have one or more associated default cards (and/or one or more default data sheets), indicating respective default layouts with one or more layout elements. The application author may then utilize the authoring interfaces and tools provided by the service to modify the default cards and layouts as needed in various embodiments.

A variety of layout element types may be supported in different embodiments. In some embodiments, for example, a particular layout item which may be indicated in a card may comprises\ one or more of: (a) a content container comprising an ordered combination of text and one or more card cells, wherein at least one card cell of the one or more card cells is associated with a cell of a data sheet, (b) a data entry form, (c) a repeater which iterates over individual rows of at least a portion of a data sheet, (d) a map, (e) a calendar entry, (f) a chart, (g) an image, or (h) a video. Individual layout elements may comprise other layout elements in at least some embodiments—that is, a hierarchical or containment relationship may be supported among various elements of a layout.

In some embodiments, respective versions of the cards and data sheets associated with at least a portion of an application may be cached locally at authoring devices such as laptops, mobile phones and the like on behalf of various collaborating application authors. Applications may be developed, in part, in an offline or local mode during periods when the authoring devices/tools are disconnected from the authoring service—e.g., in response to determining that a request to modify the mobile application has been generated from a particular mobile device, a local version of a card and/or an associated sheet may be modified initially at the particular mobile computing device. Later, in various embodiments, when the computing device connects to the authoring service and resumes online mode operations, the local version of a mobile application (generated, for example, at a particular mobile device) may be synchronized with a master version of the mobile application (which may be stored in a repository of the service, and may be accessible from various mobile devices being used for application authoring). The service may keep track of which applications are currently in offline mode in various embodiments, as well as of the changes being applied to the master version, and may provide a programmatic indication that a local version of the mobile application is not synchronized with the master version, alerting the author of the local version that changes may potentially be needed to merge the versions.

In at least one embodiment, one or more layout elements of a card and/or the underlying data sheets may be dynamically linked to respective processes (e.g., operating system processes), workflows comprising a plurality of processes, or services of a provider network or some other application which can be invoked over a network. In such an embodiment, in response to determining that a particular cell of a sheet associated with a mobile application has been updated (for example from a mobile computing device, either during application authoring or after an application has been developed and deployed), a process may be instantiated, updated or terminated at a provider network.

In some embodiments, using the security model of the underlying data sheets-based storage system, respective portions of data sheets may be made editable by different collaborating authors. In response to input from one authorized application author, for example, a determination may be made at the service that a first portion of a data sheet is editable by a first application author, and that a second portion of the same data sheet is editable by a second application author. Respective local copies of the editable portions may be cached at the devices being used by the authors in some embodiments, enabling the authors to work on their portions of the sheets and the corresponding portion of the application in parallel as desired. When an application author modifies a card of a locally cached application, the contents of the card may be obtained from the locally cached sheets in at least some modes of operation in various embodiments. The application authoring service may enable devices to be registered to receive notifications of application updates (e.g., generated by various collaborating authors) in various embodiments. In such an embodiment, when one author commits an update, notifications indicating the update has occurred may be provided to one or more other devices registered with the service. In effect, one or more devices may be designated as a respective live previewing, interaction and editing environment using the registration mechanism in various embodiments.

In at least some embodiments, the same mobile application may be deployed at several different target platforms—e.g., phones running different operating systems may be targeted, tablet devices running different operating systems may be targeted, and so on. The authoring tools may be designed to display customized versions of a given application for the different target deployment platforms—e.g., a first version of a layout (customized for a first platform) may be displayed at a device in response to receiving input indicating the first platform, and then a second version of a layout (customized for a second platform) may be displayed at the device in response to receiving input indicating the second platform.

A number of loading and pre-fetching approaches may be used in different embodiments to transfer the underlying application cards and/or data from the service to the devices where the mobile applications are being run. Loading modes in some embodiments may include, for example, a fetch-on-startup mode, a background fetch mode, a needed-data-query mode, or an on-demand mode, each of which are described below in further detail. When determining whether at least a portion of an application's data sheets are to be pre-fetched at a device, factors such as the following may be taken into account in various embodiments: (a) a dependency of a particular card of the application on a particular sheet, (b) an offline operation requirement, (c) a size of a particular sheet, (d) a security setting, (e) a determination whether a particular sheet is used for an initial layout of the mobile application, and/or (f) an observed usage pattern.

The cards-based development methodology supported by the application authoring service may allow most features of many mobile applications to be implemented using simple point-and-click types of interactions (e.g., via "what-yousee-is-what-you-get" or WYSIWYG editing tools), without requiring application code to be entered by application authors in at least some embodiments. However, in at least some embodiments, interfaces may be provided for those authors who wish to provide application source code (e.g., for advanced features that may not be covered by the point-and-click interactions) in any of several programming or scripting languages, to submit such source code for various features or functions of the application. In at least some embodiments, persistent versions of the cards associated with a mobile applications may be stored at the service's repository, and may be formatted according to a markup language (e.g., a markup language based on JSON, XML or the like).

In at least some embodiments, a mobile application authoring service may be implemented at a provider network or cloud computing environment. A customer or client of such a service, such as a businessperson who may not necessarily be skilled in at least some aspects of application development or data management but may be somewhat familiar with commonly-available spreadsheet programs, may utilize the service from various types of front-end programs running on a variety of client-side devices such as mobile phones, tablets, laptops, desktops and the like. The data entered into the cells of a given data sheet, and/or the metadata associated with the cards linked to the data sheet, may be stored at one or more storage servers at a data center, and various techniques to support high levels of availability, durability and the like for the application data and metadata may be implemented transparently. As such, an author or user of the application authoring service may not necessarily be aware of the specific algorithms and devices used to store and protect the application data and metadata. Individual authors or groups of authors may set up shared workspaces for collaborative application development in some embodiments, and workbooks comprising one or more data sheets may be created within a workspace at the request of an author. In various embodiments, techniques similar to those introduced above for authoring applications intended for mobile application environments (e.g., phones, wearable devices and the like) may be applied with equal success for authoring applications for other types of execution environments including the web environment (e.g., applications that are to run at web browsers on devices including desktops, laptop computers, tablet devices and the like.)

Example System Environment

FIG. 1 illustrates an example system environment in which a mobile application authoring service may be implemented, according to at least some embodiments. As shown, system 100 may comprise various resources and artifacts of a mobile application authoring service (MAAS) 120 in the depicted embodiment. The mobile application authoring service 120 may include at least two subsystems in some embodiment: a card management subsystem 125 and a data management subsystem 130 supporting a web-of-sheets data model. The card management subsystem 125 may enable mobile applications to be developed or authored for a plurality of supported target deployment platforms 172, such as various combinations of hardware and operating systems used for mobile phones, tablet computing devices, wearable computing devices and the like in the depicted embodiment. Cards corresponding to respective sets of one or more screen layouts of various mobile application workflows may be constructed from a variety of layout items of supported item types 174 using simple "what-you-see-is-what-you-get" or WYSIWYG application authoring tools or interfaces of the MAAS 120 in various embodiments. Persistent versions of the cards may be stored in a markup language defined in a specification 176 in at least some embodiments, and transmitted to various authoring devices for local caching as needed.

A given mobile application's data may be stored using a plurality of data sheets at the data management subsystem 130 in various embodiments. The web-of-sheets data model employed at the data management subsystem 130 may enable automated creation of sophisticated hierarchies of data sheets, e.g., in accordance with child sheet templates as discussed below in further detail. The web-of-sheets data model may also enable proxy cells to be used (e.g., with the help of filter expressions as discussed below in further detail) to refer to groups of associated cells in various embodiments, and may support similar types of navigation capabilities with regard to data sheets and cells as are possible among the pages of web sites of the world-wide-web. The use of the web-of-sheets data model may simplify the task of authoring applications significantly compared to some other application development methodologies and data models, as operations may be performed directly on the underlying data without an intervening abstraction layer.

In at least some embodiments the mobile application authoring subsystem 120 may comprise a number of storage repositories, such as application metadata repositories 150, sheet contents repositories 152 and an application template library 154. The sheet contents repositories 152 may comprise the data elements corresponding to various sheet cells, as well as information about hierarchical and proxy-based association relationships among sheet contents in various embodiments. The application metadata repositories 150 may comprise, for example, information indicating the mappings between cards and the user interaction workflow steps of various mobile applications, as well as information indicating the linkage between the cards and data sheets in at least some embodiments. A number of canonical example applications may be stored as templates in library 154 in various embodiments, usable for example as starting points for new applications.

Application authors and users may access the mobile application authoring service 120 from any of a variety of client devices in some embodiments, such as mobile devices 161A and 161B, desktop/laptop-based authoring devices 171, and the like. In the depicted embodiment, a given client-side device may be registered as a recipient of notifications regarding updates to applications, and may be used to automatically preview the modifications made to applications by any of various collaborating authors. At least a subset of the artifacts (e.g., cards and associated sheets or sub-sheets) representing an application's state may be cached locally (as indicated by blocks 163A, 163B, and 173) at the mobile devices 161 and/or the desktop/laptop client devices 171 in various embodiments, enabling customization of applications by respective authors. A given mobile device 161 may comprise a corresponding local application editor or viewer tool 165 (e.g., 165A or 165B), and a given desktop/laptop device 171 may comprise an application editor/viewer tool 166 in the depicted embodiment. In some embodiments, the application editing and/or viewing capabilities of the application editor/viewer tools 165 available at mobile devices may differ from those of the tools 166 available at desktop/laptop environments—e.g., a richer set of features may be supported at the desktop/laptop version of the tool. The application editors/viewers 165 and 166 may collectively be referred to as authoring interfaces or authoring tools in various embodiments.

In some embodiments, a client or application author may initiate the process of developing a mobile application using any of several approaches. In one embodiment, for example, an author may establish a connection to the MAAS 120 using a front-end tool running on a desktop/laptop device 171 or a mobile device 163, and submit an application development initiation request indicating one or more of: (a) an application template selected from library 154 or (b) one or more data sheets containing at least some example data elements to be accessed/manipulated in the application. One or more cards corresponding to default layouts of the template application may be identified (e.g., automatically by the MAAS 120 or based on input provided by the author). Metadata indicating the association between the card(s), the sheet(s), and the application may be stored at the MAAS 120 in various embodiments. The author may then proceed to add more layouts, modify the default layouts and so on.

In at least one embodiment, a given application author or developer may maintain connectivity to the MAAS 120 via two or more devices concurrently if desired—e.g., the author may use one desktop (to be used for much of the editing of an application during a given interaction session of the author with the MAAS) and one mobile phone (which may be used primarily but not necessarily solely for live previewing of changes made to the application via the desktop). Based for example on input received from the author, MAAS subcomponents implemented at one or more computing devices may determine that the author's mobile device has been designated as a live previewing and editing environment for the mobile application being authored. As the author edits the application using the desktop authoring interface, e.g., by creating and/or modifying a set of cards corresponding to the screen layouts of various phases of the application's workflow, respective representations or icons of at least some of the cards as well as an expanded view of a particular card may be displayed via an app editor 166 in various embodiments. The displayed contents of various cards may be based at least in part on contents of one or more data sheets materialized at a repository 152 in accordance with the web-of-sheets data model. As discussed above, the web-of-sheets model may enable automatic instantiation of a child data sheet associated with a parent cell within a parent data sheet and referencing of contents of one or more cells of a particular data sheet via a proxy cell. As such, in some embodiments a particular layout item of one of the cards may correspond to a child cell within an automatically created child sheet, while another layout item may display content via reference to a proxy cell within a data sheet.

In response to detecting an edit operation directed at the particular card, in some embodiments a combination of responsive actions may be taken by the MAAS. For example, a result of the edit may be stored at a repository 150 and/or 152, an updated representation of the particular card may be displayed at the desktop authoring interface 166, and a screen layout corresponding to the updated representation may be rendered at the mobile computing device 161 being used for live preview. The results of the editing may be rendered or made visible in real time at the mobile device in various embodiments, with no perceptible delay (as may be required for application compilation in some embodiments), making the process of reviewing changes to the application fast and transparent to the author. If the author does not like the result of a change, the corresponding card may be modified and re-viewed in real time in various embodiments. In at least some embodiments, the contents of the layouts corresponding to the cards may be changed in real time as well, e.g., by modifying the contents of underlying data sheets associated with the cards. Multiple previewing mobile devices may be used simultaneously or concurrently in various embodiments, enabling an application author to view the application as it would be presented to users with different supported target deployment platforms 172, such as phones or tablets from different vendors, which may differ from each other in device hardware, operating systems, and the like.

As mentioned earlier, in various embodiments applications may be edited in online and/or offline modes. In online mode, the version of the application artifacts (comprising one or more cards and associated data sheets) being modified by an author may be synchronized in real time with a master version maintained by the MAAS 120. In offline mode, in some embodiments a local or custom version of the application may be developed using locally cached application state artifacts 163 or 173 by an author, and the application may be synchronized when the authoring devices re-establish connectivity and the author approves the synchronization. In some embodiments, mobile devices 161 may be registered with the MAAS 120 to receive automated updates of mobile applications—e.g., changes made to a given mobile application either during the original development phases or after the application is released may be automatically propagated to the registered devices if desired. Devices which belong to or are used by any of numerous application authors and/or non-authors may be registered to receive updates of a given application in various embodiments. In at least one embodiment, instead of or in addition using the simple WYSIWYG tools provided by default by the MAAS 120 to application authors, source code and/or executable code may be provided for various features by application authors (e.g., for some advanced capabilities for which drag-and-drop type operations supported by the authoring tools are insufficient).

Card Management Subsystem

Figure 2:
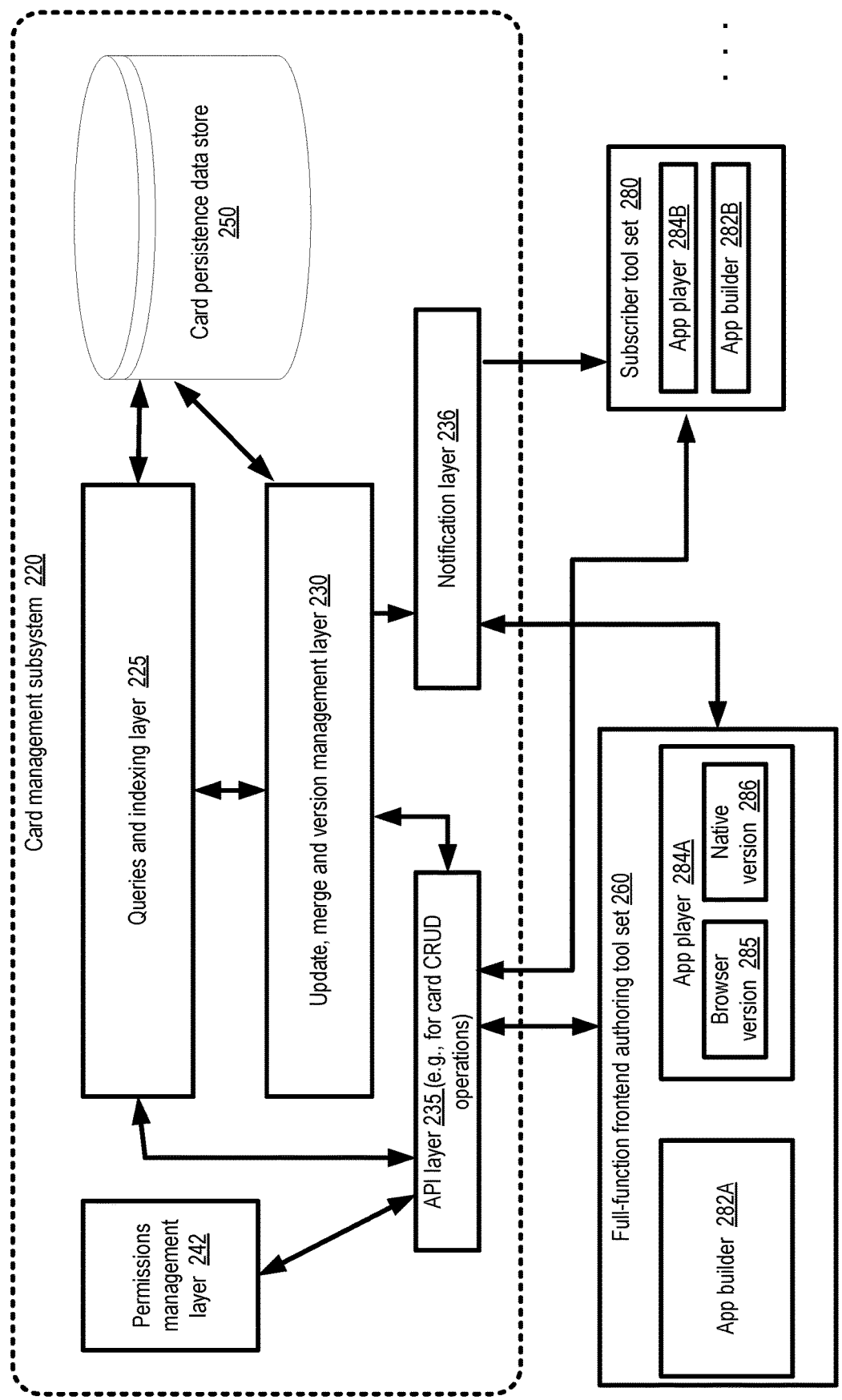
FIG. 2 illustrates example components of a card management subsystem that may be employed for mobile application authoring, according to at least some embodiments.

FIG. 2 illustrates example components of a card management subsystem that may be employed for mobile application authoring, according to at least some embodiments. As shown, card management subsystem 220 may comprise, for example, a card persistence data store 250, a permissions management layer 242, a querying and indexing layer 225, an update merge and version management layer 230, an application programming interface (API) layer 235, and a notification layer 236 in the depicted embodiment.

Persistent representations of the cards created and modified by authors using a variety of front-end editing and viewing tools may be stored at storage devices of data store 250. Any of various markup and/or scripting languages (e.g., languages based on variants of Javascript Object Notation (JSON), Extended Markup Language (XML), or custom languages etc.) may be employed to represent the cards in different embodiments.

In at least some embodiments, at least two sets of tools may be used by application authors to interact with the card management subsystem 220. A full-function frontend authoring tool set 260 may comprise, for example, an application builder 282A and an application player 284A. The application builder 282A may be used to edit the application's cards and associated layouts and data sheets in some embodiments, while the application player 284A may be used to preview application screens and interact with the application in a manner similar to the interactions of and end user. Several different player versions may be supported in different embodiments, such as a browser version 285, and/or a native version 286 for one or more targeted platforms of the applications to be developed. The full-function frontend authoring tool set 260 may, for example, be installed at a desktop or a laptop computing device in various embodiments.

A subscriber tool set 280, which may, for example be installed at a mobile phone or tablet computing device, may also comprise an application player 284B and/or an application builder 282B in the depicted embodiment. However, in at least some embodiments, the kinds of operations that are possible using the subscriber tool set may be more limited than the kinds of operations that are possible via the full-function tool set 260—e.g., at a mobile phone representing a particular target deployment platform, previews corresponding to that application platform alone (as opposed to any desired target application platform) may be shown in some embodiments, or only a limited set of editing actions may be possible.

The permissions management layer 242 may store information regarding the roles and responsibilities of various authors or other entities for a set of mobile applications being developed using cards in the depicted embodiment. The API layer 235 may allow invocation of programmatic interfaces for CRUD (create, read, update and delete) and/or other types of operations directed towards various cards by application authors in some embodiments. Before approving or implementing an API call, the permissions granted to the requester may be checked using the permissions management layer 242. The querying and indexing layer 225 may be used to find the appropriate card to which an API request is directed. Operations related to modifications of cards, including the resolution of potential conflicts, may be handled at the update, merge and version management layer 230 in the depicted embodiment. In some embodiments, the notification layer 236 may process registration requests for automated propagation of updates of the mobile applications to various subscribers, e.g., by storing records indicating the set of devices to which updates (or update notifications) are to be transmitted when an application is updated. When an application is modified in some way, e.g., as a result of a non-conflicting update committed by an author, and/or as a result of a conflict resolution by the version management layer 230, the notification layer 236 may transmit an updated version of the application to a subscriber tool set 280 and/or full-function tool set 260 of one or more registered entities in the depicted embodiment.

In various embodiments, at least some of the work associated with one or more components of the card management subsystem 220 may be performed at front-end or client-side devices, while other parts of the work may be performed at back-end services. For example, the card persistence data store 250 may be implemented at one or more data centers, while some portions of the operations related to queries and indexing may be implemented at clients-side devices (e.g., a device at which the full-function frontend authoring tool set 260 is instantiated, and/or a device at which the subscriber tool set 280 is instantiated).

Authoring Tool Interface

Figure 3:
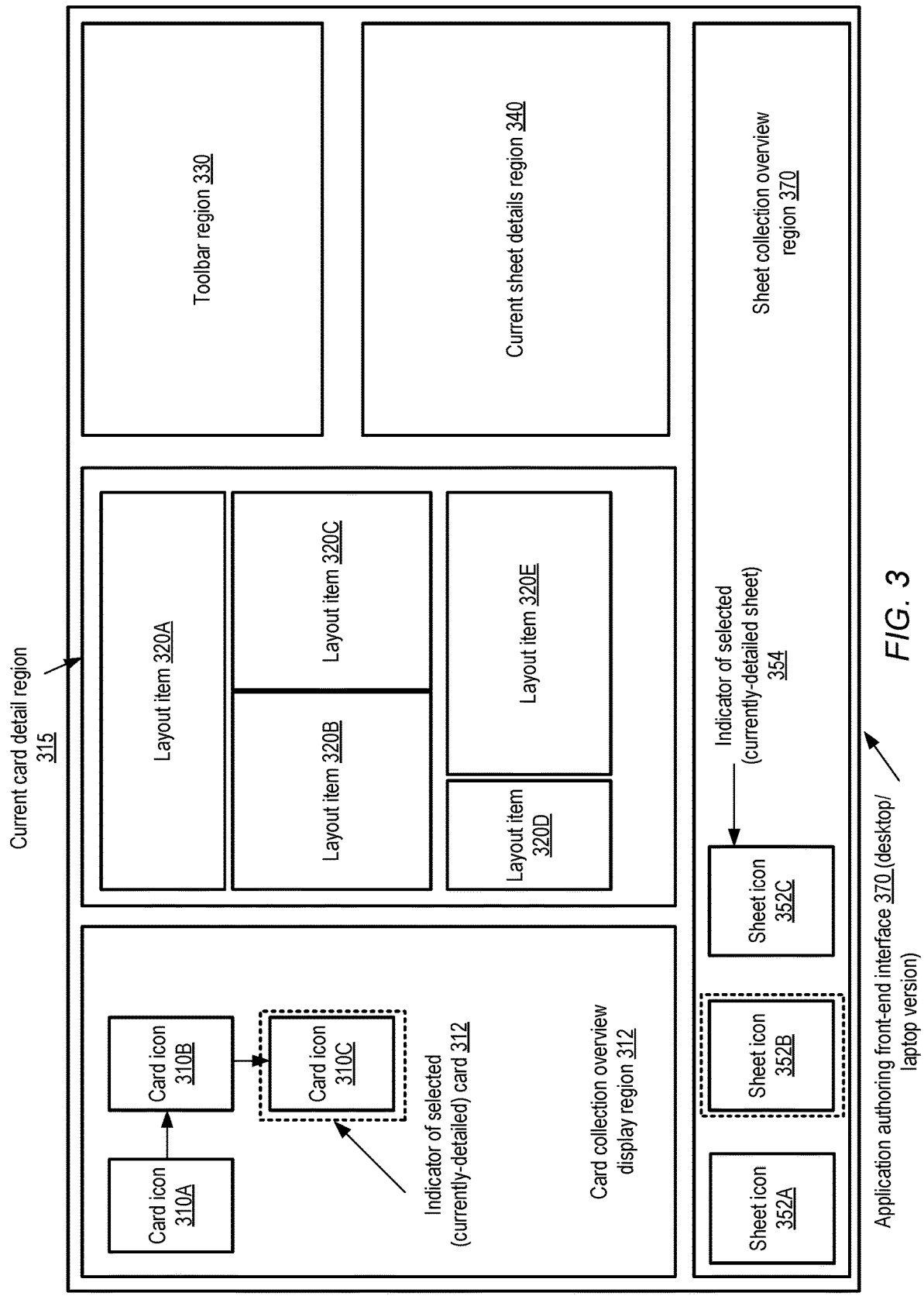
FIG. 3 illustrates an example arrangement of information that may be displayed via an application authoring front-end tool for mobile applications, according to at least some embodiments.

FIG. 3 illustrates an example arrangement of information that may be displayed via an application authoring front-end tool for mobile applications, according to at least some embodiments. The example interface 370 may be presented to an application author during a session of interaction, e.g., from a desktop-based front-end authoring tool, with a mobile application authoring service in the depicted embodiment. The presented information may be distributed among at least five regions in the depicted embodiment: a card collection overview display region 312, a current card detail region 315, a sheet collection overview region 370, a current sheet detail region 340, and one or more toolbar regions 330.

In region 312, icons 310 (e.g., 310A, 310B, and 310C) representing at least a subset of the collection of cards that have been created for a mobile application which is being developed or tested may be shown in the depicted embodiment. Arrows linking the card icons may, for example, show the flow of interactions experienced by an end user—e.g., a click on a layout item of card 310A by an application user may lead to a rendering of the layout of card 310B, and a click on a layout item of card 310B may lead to a rendering of the layout of card 310C in the depicted example. At any given point in time, details of one or more of the card collections may be shown in expanded view region 315, and the card(s) whose details are being displayed may be indicated using highlighting, a special color/font or some other indicator 312 in some embodiments.

Within the current card details region 315, various layout elements 320, such as 320A-320E, may be arranged and re-arranged as desired by the application author during the course of an editing session. A variety of layout item types may be supported in different embodiments, as discussed below in further detail with respect to FIG. 5. In various embodiments, the content shown in the layout items may be based at least in part on content stored in various data sheets being used for the application. Icons 352 (or tabs or other symbols), such as 352A-352C, representing individual data sheets may be shown in sheets collection overview region 370 of interface 370 in the depicted embodiment. Details of a currently-viewed or currently-edited data sheet (for which a visual indicator 354 such as a highlight, a contrasting color or font may be used) may be provided in region 340 in the depicted embodiment. The toolbar region 330 may comprise a collection of tools which can be used by the application author to arrange and/or format the contents of the other regions in the depicted embodiment—e.g., tools may be used to add/modify/remove cards, add/modify/remove sheets, add/modify/remove layout elements, and the like in various embodiments.

The positions, sizes, fonts, colors, and other properties of layout items 320, including their associations with data sheets of the sheet collection, may be modified using simple point-and-click and/or drag-and-drop interface elements in various embodiments, considerably simplifying the development of the mobile application. In at least some embodiments, no source code may have to be entered by an application developer in order to create a fairly sophisticated mobile application. In at least one embodiment, in addition to using straightforward graphical interactions, application authors may provide source code for some features of their applications if desired—for example, a tool of toolbar region 330 may provide a source code editor, or may allow source code files to be uploaded by application authors. The current connectivity mode (e.g., online or offline) of the authoring tool may be displayed using a portion of interface 370 in at least some embodiments. In various embodiments, the synchronization status of the local version of the application (e.g., whether the local version of the application's artifacts are synchronized with a master version stored in a repository) may also be indicated. The current card display region 315 may be considered one example of a WYSIWYG editing region in various embodiments. In at least some embodiments, output of the application builder and application player components shown in authoring tool set 260 of FIG. 2 may be combined within a single interface 370; in other embodiments, the editing and preview displays may be provided separately.

Figure 4:
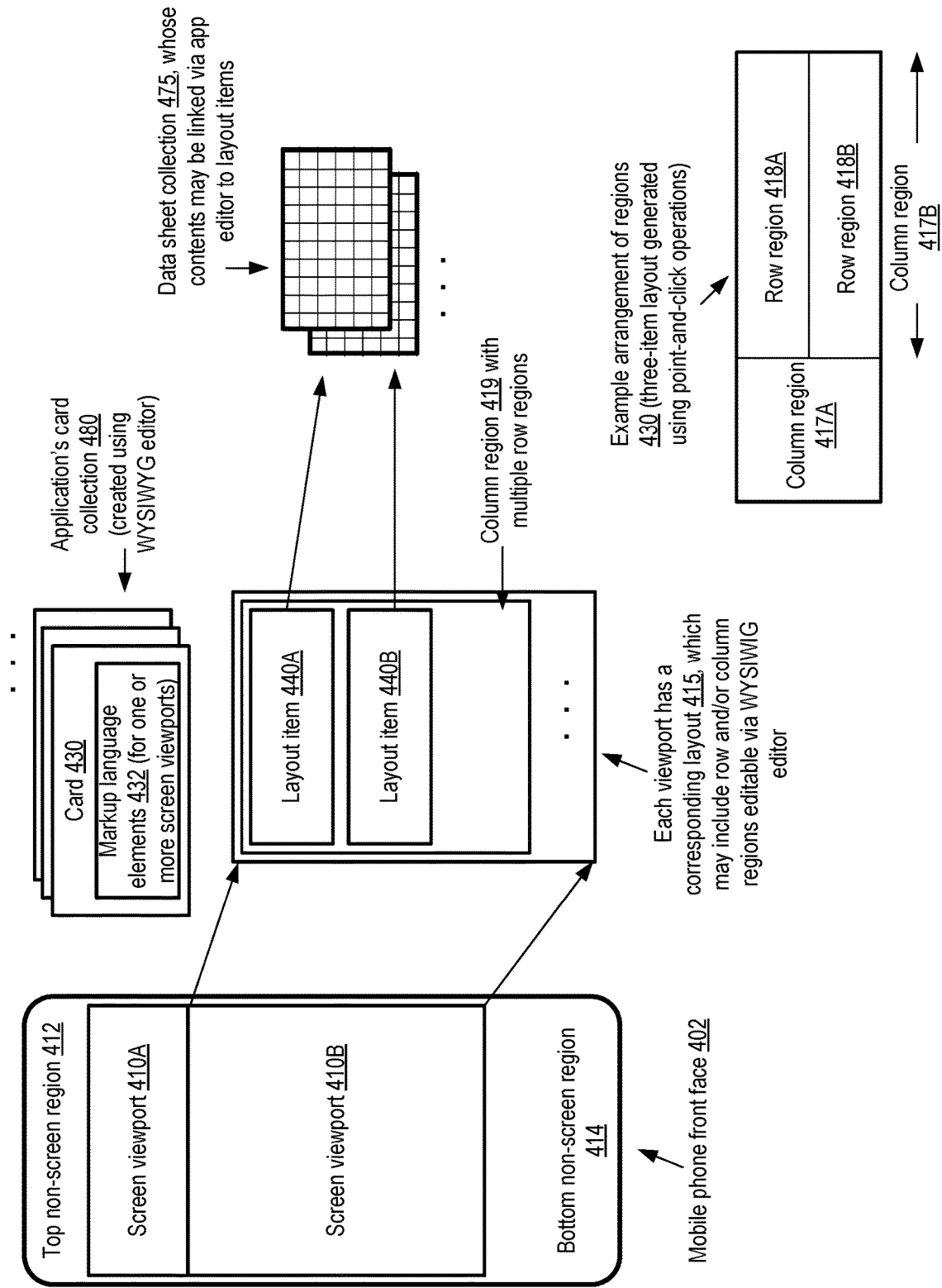
FIG. 4 illustrates example relationships between cards, viewports, layouts, regions and layout items, according to at least some embodiments.

A mobile application's screen views may comprise a hierarchy of logical subcomponents associated with a collection of cards in various embodiments. FIG. 4 illustrates example relationships between cards, layouts, viewports, regions and layout items, according to at least some embodiments. By way of example, the front face 402 of a mobile phone, one of the targeted deployment platforms for a mobile application, is shown in FIG. 4. As mentioned earlier, in various embodiments a web browser (which may be run on other types of devices such as desktops, laptops, tablets and the like) and/or other execution environments may be employed for running applications built using the authoring techniques described herein; the techniques are not limited to phones or any other specific type of execution platform. A given view of the application's screen (as would be seen by an end user, for example) may comprise one or more rectangular areas termed viewports in the depicted embodiment. The front face 402 of the phone comprises two viewports 410A and 410B in the depicted embodiment, as well as a top non-screen region 412 and a bottom non-screen region 414. A collection of cards 480 may be developed using WYSIWIG editing tools, with each card comprising markup elements 432 corresponding to one or more screen viewports.

Each viewport in turn may comprise a layout 415, comprising some number of layout items 440 distributed among one or more column or row regions in the depicted embodiment. For example, a single column region 419 with multiple embedded row regions, each containing a respective layout item 440 (e.g., 440A or 440B) is shown in the example layout of viewport 410B. The contents displayed in the layout items 440 may be linked to, or be based at least partly on, contents of the cells of one or more sheets of data sheet collection 475 in the depicted embodiment. The relationships between specific layout items and sheet cells may be indicated via the application authoring/editing tools in various embodiments.

Although a relatively simple one column multi-row region is shown by way of example in layout 415, more complex layouts may be created using the WYSIWYIG authoring tools in various embodiments. For example, arrangement 430 shows a layout with two column regions 417A and 417B which collectively span the width of the viewport, while the second column region 417B id subdivided into two row regions 418A and 418B. Furthermore, in at least some embodiments, layouts may be nested within other layouts—e.g., one layout element may contain one or more other child layout elements, the child layout elements may contain their own child layouts, and so on.

Example Categories of Layout Items

Figure 5:
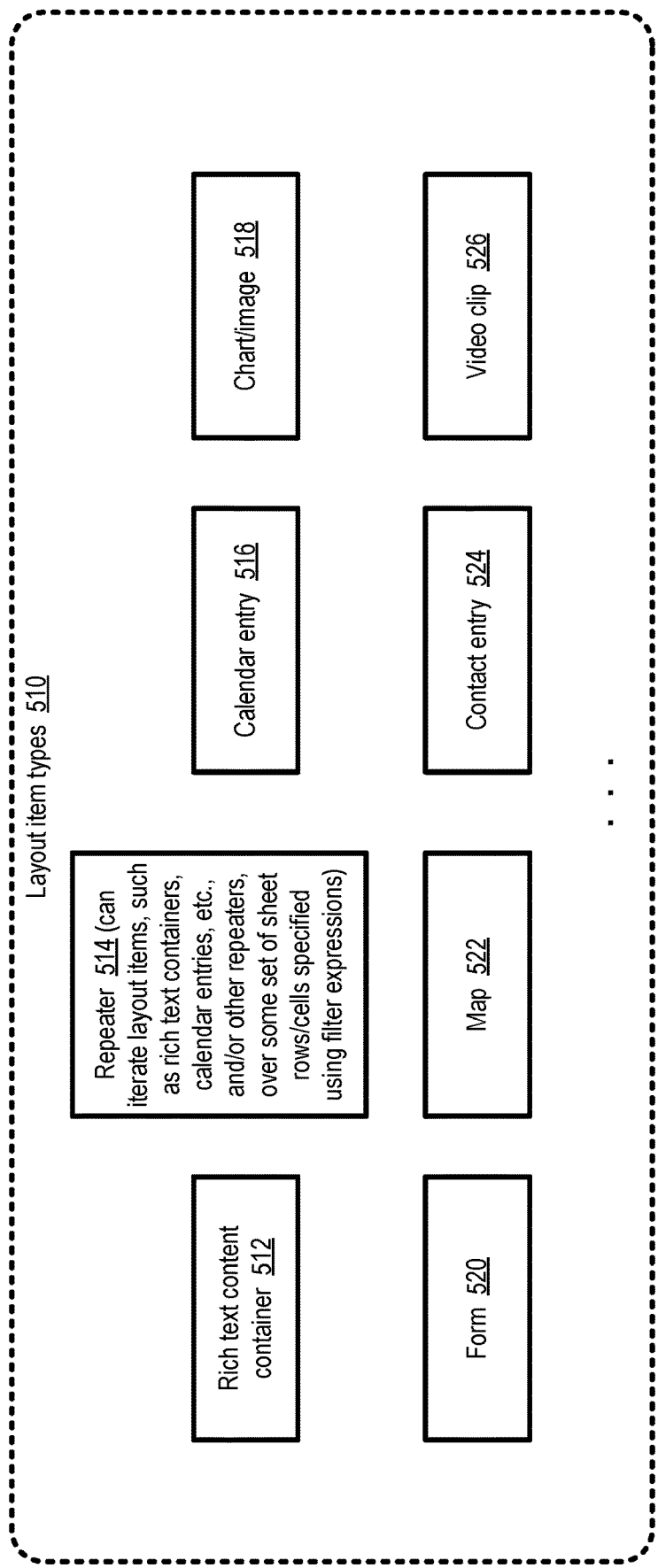
FIG. 5 illustrates example categories of layout items which may be used for mobile applications, according to at least some embodiments.

The layouts rendered for various portions of a mobile application's workflow may comprise a wide variety of layout items and corresponding data types in various embodiments. FIG. 5 illustrates example categories of layout items which may be used for mobile applications, according to at least some embodiments. As shown, the layout item categories may comprise, among others, rich text content containers 512, repeaters 514, calendar entries 516, charts/images 518, forms 520 which may be used for data entry, maps 522, contact entries 524, video clips 526.

In at least one embodiment, when developing an application, the content of a given layout item may be specified using a desired combination of static assets (e.g., a string of text entered by the application author, or an image imported into a layout item by the application author) as well as sheets-based assets (as when an author links the content of a layout item to one or more cells of one or more data sheets). In some embodiments, a rich text content container 512 may comprise text formatted as indicated by the application author, emoticons, inline images or images obtained via links to a repository of the mobile application authoring service, action elements for invoking processes or issuing service requests, as well as card cells linked to data sheet cells. The properties of a rich text content container that may be specified by the application author may include, for example, justification/alignment, wrapping/truncation, the locations of any desired explicit newlines, minimum width and height, margins, padding, and so on in various embodiments. A given container may comprise zero or more card cells, each logically associated with one or more data sheet cells in some embodiments.

A repeater 514 may, as suggested by the name, be used to iterate over some number of data sheet cells of one or more data sheets in various embodiments—e.g., using a scrollbar or other interactive elements, a user may be able to move up and down among rows of a set of columns of one or more data sheets for which a repeater layout item has been created. In at least some embodiments, the data stored in the underlying sheets may be filtered or transformed before being included within a layout element such as a repeater or a rich text content container, based for example on a filter specification indicated by the application author.

A repeater 514 may be considered the logical equivalent of a recursion mechanism for layout items in various embodiments—e.g., a given repeater may be used to iterate a set of other layout items (which may include other repeaters, which may in turn iterate over other items, and so on) over some set of rows or cells of one or more sheets. Any combination of one or more of the layout item types shown in FIG. 5 may be iterated over using a given repeater in some embodiments. As such, in combination with the web-of-sheets model, repeaters may provide an extremely powerful way of presenting relevant sets of data to application users, without requiring program code comprising complex database query terms or database connectivity protocol interfaces.

In at least one embodiment, an easy-to-use filter expression language may be supported, which can be used to link relevant subsets of data stored in specific rows of data sheets with specific proxy cells, and the proxy cells can then be bound to repeaters. For example, consider a task management application, in which a set of rows of data sheets are used to store information (such as due dates/times, estimated task implementation time requirements etc.) for various tasks of a group of individuals collaborating on one or more projects. One of the individuals User1 may be interested in using the mobile application to view tasks that are due within the next day, while a second individual User2 may be more interested in using the mobile application to view all tasks assigned to User2 that are past their due date. Respective expressions for filters which can be used to retrieve the tasks of interest to the different users may be created (e.g., using drop-down elements of a graphical interface implemented for the expression language) for respective proxy cells ProxyCell1 (for User1) and ProxyCell2 (for User2) in some embodiments. Those proxy cells may then be bound with repeaters of one or more layout element types in some embodiments, enabling the relevant subsets of the data to be displayed for the different users, without requiring the application author to write code. An application author may simply submit a programmatic request (e.g., using a point-and-click mechanism) to bind a repeater layout item of a particular card to a proxy cell which has an associated filter expression defined. When a user or application author interacts with the portion of the application implemented using the repeater, in various embodiments the application authoring service may retrieve the appropriate content from the cells of one or more sheets based on the filter, and the retrieved data may then be displayed (e.g., with an iteration interface element such as a scrollbar enabling the user to iterate over the contents).

The mobile application authoring service's front-end tools may provide features to indicate various properties of calendar entries 516 (e.g., the format to be used to display the entries within the layouts of a card, the source calendar program from which the content is to be obtained), charts or images 518 (whether static or based on content in sheets), forms 520 which may be used for entering information and populating data sheets, portions of maps 522, contact entries 524 as well as video clips 526 in various embodiments. Layout elements for other types of data that may be accessed or manipulated in mobile applications, such as audio clips and the like, may also be supported in some embodiments.

Data Sheets Management Subsystem

Figure 6:
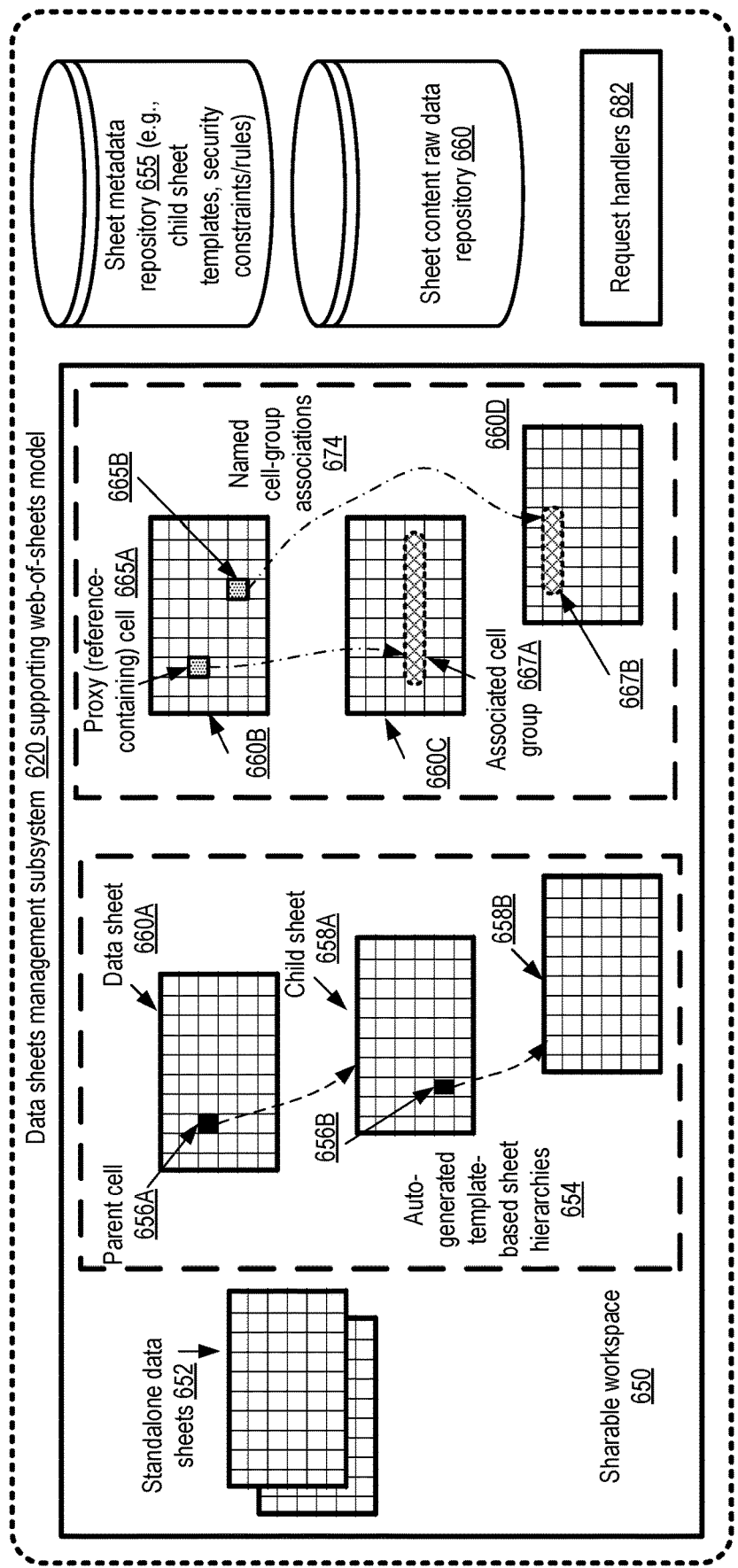
FIG. 6 illustrates an example data sheets management subsystem which may be employed for mobile applications, according to at least some embodiments.

FIG. 6 illustrates an example data sheets management subsystem which may be employed for mobile applications, according to at least some embodiments. As shown, the data sheets management subsystem 620 which may be used to support several different types of data sheets within sharable workspaces 650. A data sheet may comprise a grid of cells arranged in rows and columns; data sheets may also be referred to as worksheets in some embodiments. In one embodiment, collections of one or more data sheets may be referred to as workbooks, with respective worksheets being represented as files, and individual data sheets being accessed from within a workbook, for example, via tabs or similar interfaces. To simplify the presentation, workbooks are not discussed further in much of the subsequent description, and are not shown in the figures; instead, the discussion is framed in the context of data sheets.

One or more sharable workspaces 650 may be established on behalf of a given application author or sheets subsystem client in the depicted embodiment, e.g., in response to requests submitted from a front end tool of an application authoring service, and/or a separate sheets-related tool, via programmatic interfaces. The requests may be received and handled by one or more request handlers 682 implemented at one or more computing devices in the depicted embodiment. The client on whose behalf a workspace is created (or other entities to whom the client delegates responsibilities) may be responsible for setting up permissions associated with sharing the workspace—e.g., read, write, modify, delete, and other permissions with respect to the workspace 650 or individual sheets may be granted to other clients as desired. In at least some embodiments, templates used to create child sheets may include some types of security-related properties as well.

A given workspace 650 may comprise, for example, one or more standalone data sheets 652 as well as least two types of groups of logically related data sheets in the depicted embodiment. In accordance with a web-of-sheets data model of the sheets management subsystem, an auto-generated template-based sheet hierarchy, such as hierarchy 654, may be created on behalf of authorized clients or authors in some embodiments. In addition, named cell-group associations 674 (which may also be referred to as row links) may be generated and stored in some embodiments in accordance with the web-of-sheets model.

In at least one embodiment, a client may designate one or more cells of a given data sheet 660A, such as a column containing cell 656A, as parent cells. Such a designation may imply that if and when a new parent cell is added (or data is entered into a previously blank parent cell), one or more child sheets such as child sheet 658A is to be instantiated automatically by the sheets management subsystem 620 in the depicted embodiment. A sheet such as 660A containing one or more parent cells may be referred to as a parent sheet in some embodiments; note that a data sheet may be both a parent sheet and a child sheet in at least some embodiments. Child sheets may also be referred to as details sheets in one embodiments, as they may include supporting details about data that is summarized in the parent sheets. The properties of the child sheet may be specified by the client, e.g., by providing names and/or formulas for various cells of the child sheet, and/or by providing example cell contents for the child sheet which can be extrapolated/generalized by the sheets management subsystem. Properties of the child sheet may be stored in the form of persistent metadata objects called templates in some embodiments, which may be stored along with various other administrative information in a metadata repository 655.

Multi-level hierarchies of parent and child data sheets may be generated automatically based on templates in some embodiments—e.g., sheet 658A may be created as a child sheet of parent cell 656A of sheet 660A, sheet 658B may be created as a child sheet of parent cell 656B of sheet 658A, and so on. From a given parent sheet, multiple instances of multiple types of child sheets may be created in some embodiments; that is, branching may be supported in the hierarchy. Any desired type of content that can be represented using a grid of cells may be stored in a given sheet at any level of the hierarchy in various embodiments.

In at least some embodiments, a lazy or on-demand materialization strategy may be used for child sheets—e.g., while a new child sheet may be logically instantiated as soon as data is entered into a parent cell (or as soon as a new parent cell is created), the memory/storage to be used for data of the child sheet may not necessarily be allocated until the child sheet is accessed or navigated to. In effect, in various embodiments, when a parent cell is populated or created, this may initially be interpreted simply as an intent to create a child sheet, and the child sheet itself may be materialized or populated later, when an intent to display or to enter data into the child sheet is discerned. According to some embodiments, in response to one or more programmatic interactions, the sheets management subsystem may store a representation of child template associated with a parent group of one or more cells of a first data sheet. For example, a logical table T1 with several columns C1, C2, C3, . . . , may be defined in a particular data sheet DS1 in one embodiment, and the cells of C1 may be designated as parent cells, such that whenever a new entry is added in row C1, a corresponding child data sheet with properties indicated in a child template CT1 is created automatically. (In various embodiments, a logical table may comprise some number of rows and columns that are formatted and managed independently from other rows and columns of a data sheet.) Properties indicated in a child template may, for example, include a name to be assigned to the child sheet, names of various rows and/or columns of the child sheet (or a child table T2 within the child sheet), formulas to be used to populate the cells of the child sheet, rules or constraints regarding the automatic propagation of data to/from the child sheet, and so on. For example, in one embodiment, a "copy-up" rule may allow data that is entered into a cell in a child sheet to be propagated to the parent data sheet (e.g., to update cells whose formula refers to data in the child sheet), while a "copy-down" rule may allow data that is entered into a cell in a parent data sheet to be propagated to a child sheet. In at least some embodiments, by default, until the user specifies the properties by providing examples or entering the properties into a form-like interface, a template may not necessarily contain any properties to begin with.

Rules regarding the accessibility of data among the sheets of a hierarchy may also be stored in the metadata repository 655 in at least some embodiments—e.g., such rules may indicate which portions of a child sheet are to be accessible from a parent sheet and vice versa, which updates to a child sheet are to be propagated to parent sheets and vice versa, etc. The raw data for various cells (e.g., data that is not computed and updated automatically based on values of other cells) may be stored in a separate repository 660 in the depicted embodiment. In at least some embodiments, for example, depending on the rules set up, when a value of a cell in a child data sheet (such as 658A or 658B) is modified, a corresponding child-dependent value may be updated in one or more parent sheets. In at least some embodiments, in accordance with the granted permissions, cells of a child sheet may be referred to using references to the parent cell of the child sheet. For example, if the parent cell is identified by a [row, column] combination [r1, c1], the contents of the cell in position [r2, c2] in the child sheet may be referenced using a notation similar to =[r1, c1][r2, c2].

In addition to hierarchical relationships such as those between parent cells and child sheets, in at least some embodiments the sheets management subsystem 620 may enable the creation of logical associations (which may also be referred to as "row links") between groups of cells and referring cells (which may also be termed proxy cells). For example, proxy cell 665A of sheet 660B may be associated with a cell group 667A of sheet 660C, while proxy cell 665B of sheet 660B may be associated with cell group 667B of sheet 660D in the depicted example scenario. In order to store persistent information about such associations, in the depicted embodiment a component of the subsystem 620 may generate a respective immutable or invariant object, such as a hidden key, representing the association between the proxy cell (e.g., 665A) and the group of associated cells (e.g. 667A). The object may be invariant in that the association may remain valid (and results obtained from formulas referring to the associated cells, expressed using the identifier of the proxy cell, may remain unchanged) regardless of whether the group of associated cells is moved around, e.g., as a result of sorting or other operations in sheet 660C or 660D. The proxy cells which are associated with groups of other cells may also be referred to as row-link cells in at least some embodiments. In at least one embodiment, when creating a logical association, the target group of cells with which a proxy cell is to be associated may be identified using a search interface. For example, to indicate that a search is to be conducted, a client may type in the first few letters or numerals of a value stored in the targeted group of cells, and the data management service may indicate cells whose contents match the first few letters or numerals. The client may then pick one of the search results (and some number of adjacent cells) as the cell group for the proxy cell.

The displayed content of a proxy cell such as 660B (i.e., the content visible to users) may be derived from some combination of content of one or more cells of the referenced cells in some embodiments, e.g., based on a display formula or specification indicated by the client on whose behalf the association is created. Formulas that refer to the contents of the associated cells may be expressed via the row link cell in some embodiments. For example, if one of the cells in a row of cells which form the associated cells contains a value for an "Age" column, and the proxy cell is at cell [r1, c1], in one implementation the age value from CG1 may be obtained using a notation similar to =[r1, c1][Age].

In at least some embodiments, parent cells and/or proxy cells may be distinguished from other cells within data sheets using, for example, a special symbol, font or color scheme. In one embodiment, a menu element (such as a drop-down menu option) may be employed by a client to designate that a particular cell is a parent cell or a proxy cell. The specific values/labels that are displayed within the parent cells and/or the row-link cells may be selected or specified by clients in some embodiments.

In various embodiments, fairly complex relationships between various data elements or records may be established using hierarchical and group association features similar to those described above. For example, a hierarchy may comprise thousands of data sheets, and logical associations may potentially be created among large numbers of cells and cell groups. In some such embodiments, the data sheets management subsystem 620 may provide a summary visualization of the relationships within a given workspace, e.g., indicating how many sheets there are at various levels of the hierarchy, the association relationships that have been created for various groups of cells, and so on. Such a summary view may be provided, for example, in response to a programmatic query, and details of various parts of the web of sheets may be obtained in response to "zoom-in" requests and the like in some embodiments.

In addition to the core ability to easily model hierarchical relationships and permanent associations among cells, the web-of-sheets model may provide several additional practical benefits useful for collaborative application authoring in various embodiments. Respective security or access sharing settings may be set up for the different sheets in a workspace, for example, enabling a cleaner separation of rights and responsibilities among the appropriate set of collaborating application authors or other users than if the users/authors all had to share access to a single large data sheet. Locking of data at the cell level or row level, which may be inefficient and inconvenient for collaborating users, may not be required if the data is spread across a hierarchy or "network" of linked of sheets using the features of the web-of-sheets model.

The web-of-sheets model may also make it easier to parallelize at least some types of recalculation operations in at least some embodiments. Recalculation or "recalc" operations may be needed when, for example, the formulas for various cells of one or more sheets are defined in such a way that a change to a value in some set of cells triggers changes to the values in one or more other sets of cells, which may in turn result in updates to mobile applications deployed at various devices. The dependency trees for some recalculation operations may be fairly complex. As a result of distributing the data of an application among a hierarchy of sheets and/or linked sheets, it may become easier to perform some recalculations in parallel. Consider a scenario in which an application's data is distributed among a three-level hierarchy of sheets, L1, L2 and L3, such that some recalculation dependencies exist between the L3 and L2 levels and other recalculation dependencies exist between the L2 and L1 levels. Depending on the nature of the application, calculations involving dependencies among respective pairs of sheets at the L3 and L2 layers may be performed in parallel in such a scenario, and similarly, calculations involving dependencies among respective pairs of sheets at the L2 and L1 layers may be performed in parallel. As a result, the total time needed to perform a complex recalculation may be reduced.

In contrast to at least some spreadsheet applications, in which some data sheets may only be reached by clicking on tabs, the web-of-sheets model may enable a more intuitive navigation method (similar to navigation among pages of the world-wide web) for accessing logically related sets of cells in various embodiments. For example, in at least some embodiments, a user or application author may navigate to a child sheet simply by clicking on a parent cell, and navigate back to the parent sheet if desired by clicking on a parent-proxy cell in the child sheet; clicking on tabs may not be required. Proxy cells may also be used to navigate among groups of cells which are not hierarchically related in various embodiments.

In at least some embodiments, a number of programmatic interfaces may be implemented by the data sheets management subsystem 620, such as one or more web-based consoles, application programming interfaces (APIs), command-line tools, and/or graphical user interfaces that can be used to manage and interact with the workspaces and their data sheets. In at least one embodiment, one or more APIs may enable the bulk uploading or transfer of data into data sheets, e.g., from a stream of incoming data records or from legacy data stores.

In various embodiments, in addition to the support for hierarchical or association relationships, the data sheets management subsystem 620 may also support the use of standalone data sheets or workbooks with common spreadsheet-like capabilities such as charts, data analysis tools such as sorts/pivot tables, and the like. That is, the hierarchical and logical association capabilities offered by the service need not be used by some clients for whose applications baseline spreadsheet capabilities are sufficient. In various embodiments, standalone data sheets may be combined, within a given workspace, with automatically-generated sheet hierarchies and/or sheets containing logical links to associated groups of cells.

In at least some embodiments, a network-accessible sheets-based data management service, e.g., a service implemented in a provider network or cloud computing environment, may be used for the application data of a mobile application authoring service, e.g., instead of using an internal (with respect to the application authoring service) subsystem.

Example Hierarchy of Data Sheets

Figure 7:
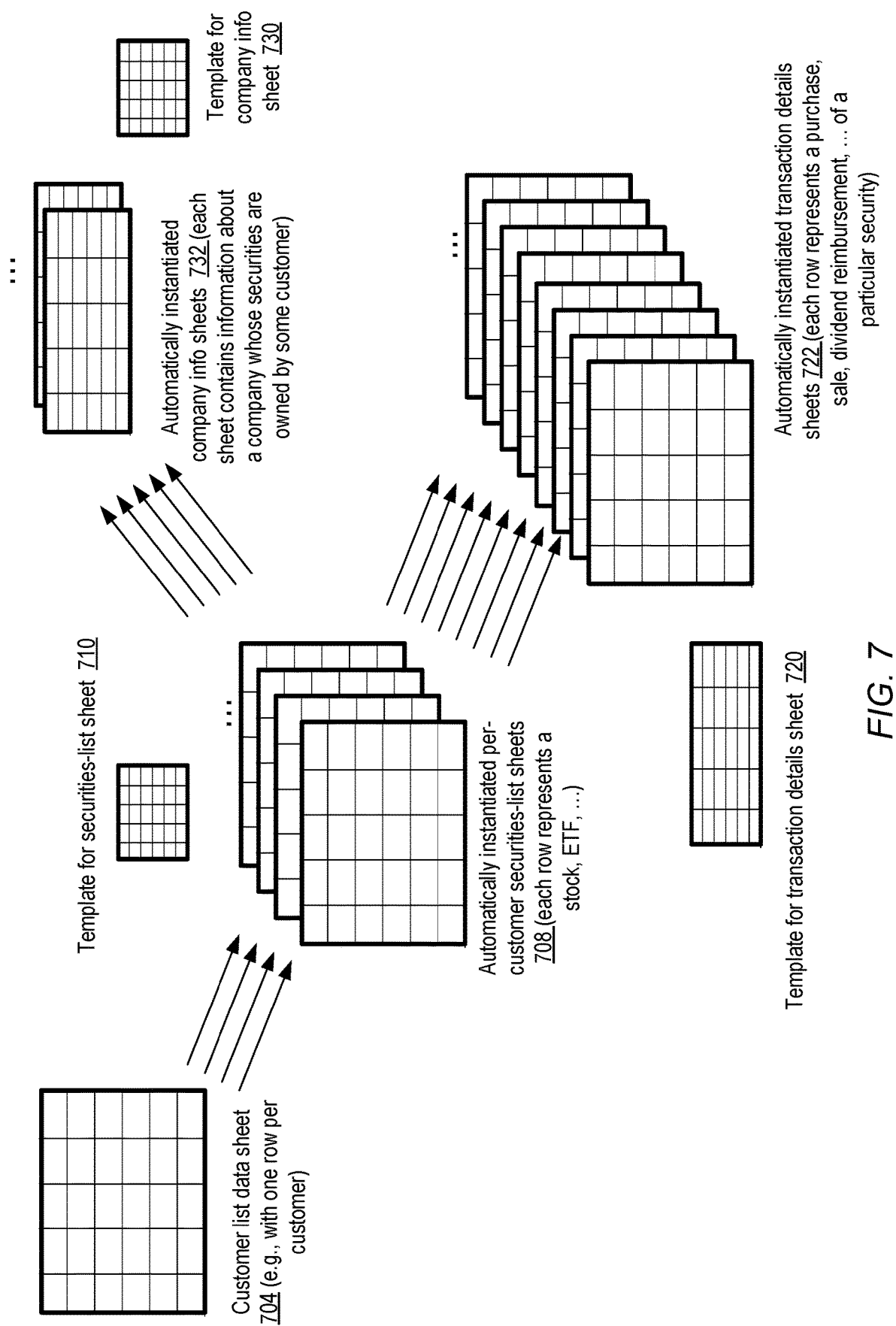
FIG. 7 illustrates an example automatically created hierarchy of data sheets that may be used for a mobile application, according to at least some embodiments.

FIG. 7 illustrates an example automatically created hierarchy of data sheets that may be used for a mobile application, according to at least some embodiments. The data stored at various levels of the hierarchy may be made accessible to authorized end users via various layout items of an application created using tools similar to those discussed above. In the depicted embodiment, a multi-layer hierarchy of data sheets may be used, with a customer list and summary information about the securities portfolios of various customers of the application being stored at a top-level customer list data sheet 704. One row of sheet 704 may be used for each customer in the depicted embodiment. Various columns of sheet 704 in a given customer's row may, for example, display the overall value of the portfolio, a graphical indication of the client's overall asset allocation mix, the overall year-to-date gain/loss, the current day's gain/loss, unrealized versus realized gains and losses, the date of the next scheduled automatic transaction of the client (if any), and so on.

Corresponding to each customer for whom a row is populated in data sheet 704, a respective child sheet 708 comprising a list of securities held by the customer may be created automatically. Each row of a given sheet 708 may comprise summarized information about an individual security owned by the customer, such as a stock, a bond, a mutual fund, an exchange traded fund, or the like. The summarized information may for example indicate the total number of shares/bonds, the current value, today's price change, year-to-date or lifetime performance where applicable, and so on. The securities list sheets 708 may be organized in accordance with a template 710 in the depicted embodiment, where the template may include various elements of metadata similar to those discussed earlier.

Each customer represented in the portfolio tracking application may initiate various transactions over time for any given security holding. Details of the transactions associated with a given security of a given customer may be tracked using a respective automatically instantiated transaction details sheet 722 as a child sheet of the securities-list sheet, generated according to a template 720 in the depicted embodiment. Individual rows of a transaction details sheet 722 may represent, for example, a respective purchase transaction, a sale transaction, a dividend reimbursement transaction, a stock split transaction, and so on. Several different types of child sheets may be associated with a given parent sheet, or even with a given parent cell of a parent sheet, in various embodiments. For example, company information sheets 732 may also be created as child sheets of the securities-list sheets 708 in the depicted embodiment, in accordance with a template 730. Each such company information sheet may, for example, comprise arbitrary text, numeric, image, and other types of data in its cells, as needed. Any desired type of data may be stored in data sheets at various levels of the hierarchy in some embodiments—e.g., sheets may not necessarily be restricted to containing lists of records, or to any other specific data organization. In various embodiments, some or all of the child sheets shown in the hierarchy of FIG. 7 may include proxy cells pointing to respective parent cells, enabling navigation up and down the hierarchy as desired. Various other proxy cells may also be used to enable references to other groups of cells, either at the same level of the hierarchy or across one or more levels.

The fan-out between the different layers of a multi-layer hierarchy of sheets may be quite large in some embodiments, e.g., potentially resulting in the automated creation of thousands or tens of thousands of child sheets in some cases. In at least one embodiment, as mentioned earlier, a visual overview of the hierarchy may be provided to a data management subsystem client such as an application author, e.g., in response to a programmatic query. Such a visualization may, for example, show how many sheets have been set up at each layer, the total number of sheets, the total amount of data stored, and so on. The visualization may include interactive elements in some embodiments, enabling users to drill down into selected parent and/or child sheets as needed. In at least some embodiments, the visualization may be presented as a graph indicating various types of relationships, including hierarchical relationships, association relationships, data flow dependencies or relationships, and so on. A data flow relationship may indicate, for example, a scenario where an update to some set of cells is propagated to some other set of cells for use in a formula. In one embodiment, performance information (such as the volume of data that has flowed between related cells over some time interval) may also be included in such a graph-based visualization.

Example Programmatic Interactions

Figure 8:
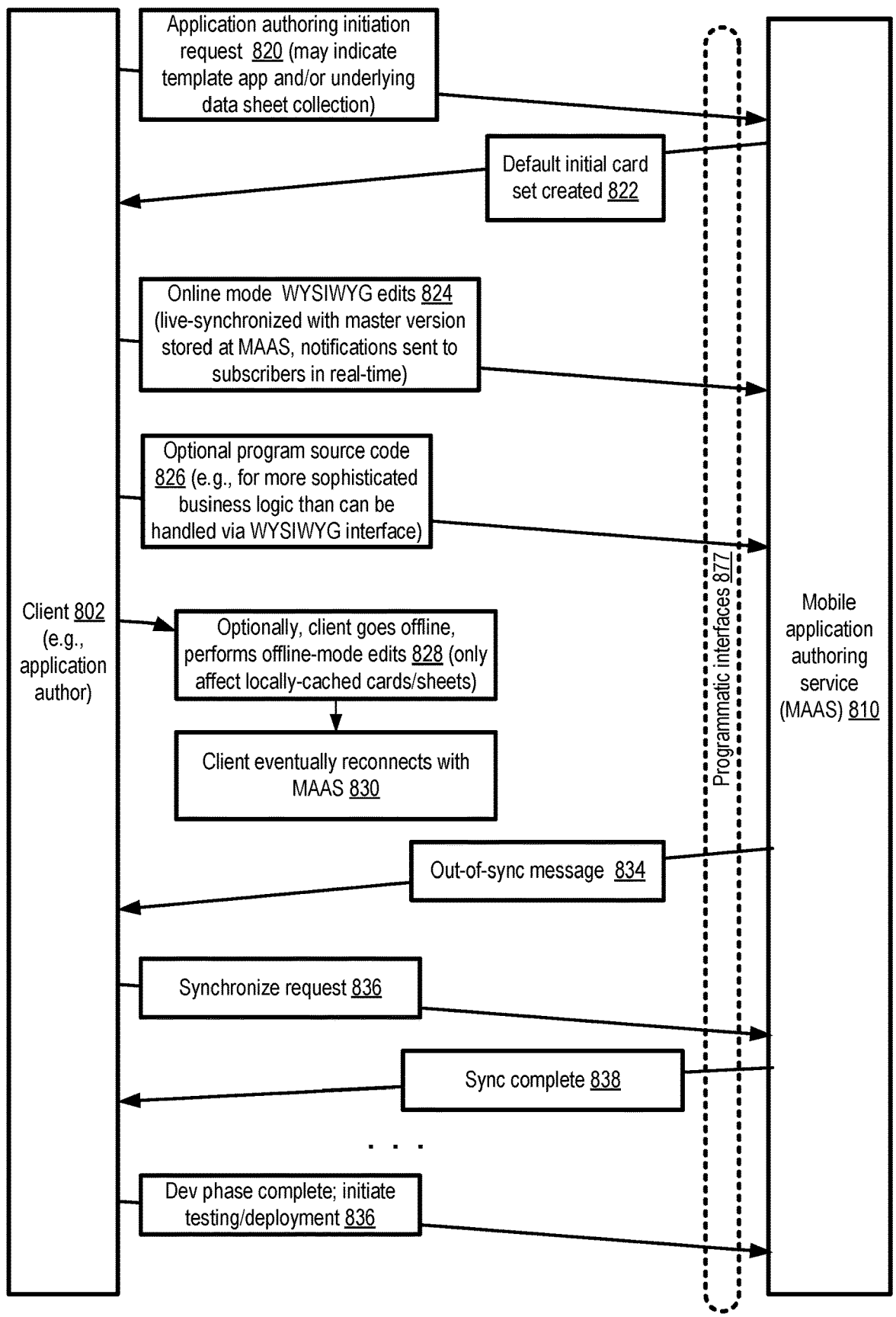
FIG. 8 illustrates example interactions of a client with a mobile application authoring service, according to at least some embodiments.

FIG. 8 illustrates example interactions of a client (such as an application author or developer) with a mobile application authoring service, according to at least some embodiments. As shown, a client 802 may submit an application authoring initiation request 820 in the depicted embodiment to the mobile application authoring service (MAAS) 810 via programmatic interfaces 877 to start the development of a new mobile application. A variety of programmatic interfaces 877 may be supported in different embodiments, such as the full-function and subscriber interfaces/tools discussed earlier, APIs, command-line tools, web-based consoles, other graphical user interfaces, and the like. In at least some embodiments, the request 820 may indicate a template application selected from a library of available templates, indicating a starting version of an application that the client wishes to enhance or modify. In various embodiments, a data sheet collection comprising one or more data sheets materialized according to the web-of-sheets model discussed above may be indicated in the request 820 as the source of at least a portion of the data to be accessed/manipulated/entered via the mobile application.

In some embodiments, a default initial set of one or more cards 822 may be identified or created at the mobile application authoring service 810 in response to the request 820. The cards themselves, and the content and initial layout of the cards may be selected, for example, based on the template application indicated in the request and/or on the application's data sheet collection. The MAAS may store one or more metadata records indicating (a) that the cards represent respective screen layouts of the mobile application and (b) an association between individual cards and the individual data sheet in some embodiments, and cause representations of one or more of the cards to be displayed via the application authoring interface used by the author. In some embodiments, the MAAS 810 may simply create an empty card and allow the client 802 to start editing the empty card.

The client 802 may then begin editing the cards and/or the data sheet collection in online mode in the depicted embodiment, e.g., using a WYSIWYG editor/viewer tool similar to the tools discussed earlier. The online mode edits 824 may be synchronized in real time with a master version of the application's metadata and sheets stored at the MAAS. As the client makes changes to an application, the updated version of one or more layouts of the application may be displayed at the editing tool being used in the depicted embodiment. If any additional devices (such as a mobile phone that the client wishes to use to live preview the application changes) has been registered as a notification recipient or subscriber, indications of the updated version may be transmitted in real time to such additional devices in at least some embodiments, e.g., without any delay between the submission of the modifications by the client and the updated rendering of the modified application layout(s). The delays often experienced in other types of application development environments, e.g., associated with application compilation, linkage and deployment, may be avoided in various embodiments using the card-based process implemented at the MAAS 810, making the process of application development much more responsive and user-friendly.

In various embodiments, a client may decide that, in addition to using the WYSIWYG tools to develop at least a portion of a mobile application, some features of the application may require more complex logic that requires program source code to be submitted. Such optional source code 826 may also be submitted via the programmatic interfaces 877 in at least some embodiments, and stored in a repository at the MAAS along with metadata indicating how and where the source code is to be incorporated within the logic of the application.

Clients may also develop applications in offline mode (i.e., while disconnected from the MAAS 810) in the depicted embodiment. Artifacts indicative of the application state (such as cards, sheets and the like) may be cached locally at the devices used by the client 802, and such locally cached artifacts may be edited (as indicated in element 828) without immediately affecting the master version of the application (or propagation of updates to any other subscribers or collaborators) in various embodiments. The client 802 may eventually reconnect their authoring tool(s) with the MAAS (element 830). If the local version of the application is no longer synchronized with or identical to the master version stored at the MAAS, an out-of-sync message 834 may be transmitted to the client 802 in some embodiments.

If the client 802 wishes to synchronize the local version of the application with the master version, a synchronize request 826 may be sent in some embodiments to the MAAS 810. In response, any conflicts that may be detected may be resolved at the MAAS, the changes made locally by the client 802 may be merged with the master version, and a sync complete message 838 may eventually be transmitted to the client 802 in at least some embodiments. It is noted that it may sometimes be the case that an application author may wish to create and use a custom version of a mobile application, and may not necessarily want to synchronize the custom version with the master version. After the development phase of the application is complete, testing and/or deployment phases of the application lifecycle may be initiated as indicated in element 836 in the depicted embodiment. Other types of programmatic interactions than those shown in FIG. 8 may be supported in at least some embodiments—e.g., interactions that change the permissions granted to various other clients with respect to one or more applications or application artifacts may be supported.

Data Loading and Pre-Fetching

Mobile devices to which the applications developed using a mobile application authoring service of the kind discussed above may differ substantially from one another with respect to memory, network bandwidth available for connectivity to the MAAS, and other capabilities. Because of the manner in which application data may easily be split among various data sheets (or even sub-sheets), a number of different techniques may be used regarding how and when application cards and/or associated data sheets are loaded or copied from the MAAS to the target. Application authors may, for example, indicate or define policies based on a number of considerations to be used to load application data at target devices in various embodiments. In various embodiments, because of the design of the underlying web-of-sheets data model and the card management subsystem, a large amount of metadata may be available at the application authoring service to enable intelligent decisions to be made regarding how to load applications and sheet contents, and/or to support offline modes of operation.

Figure 9:
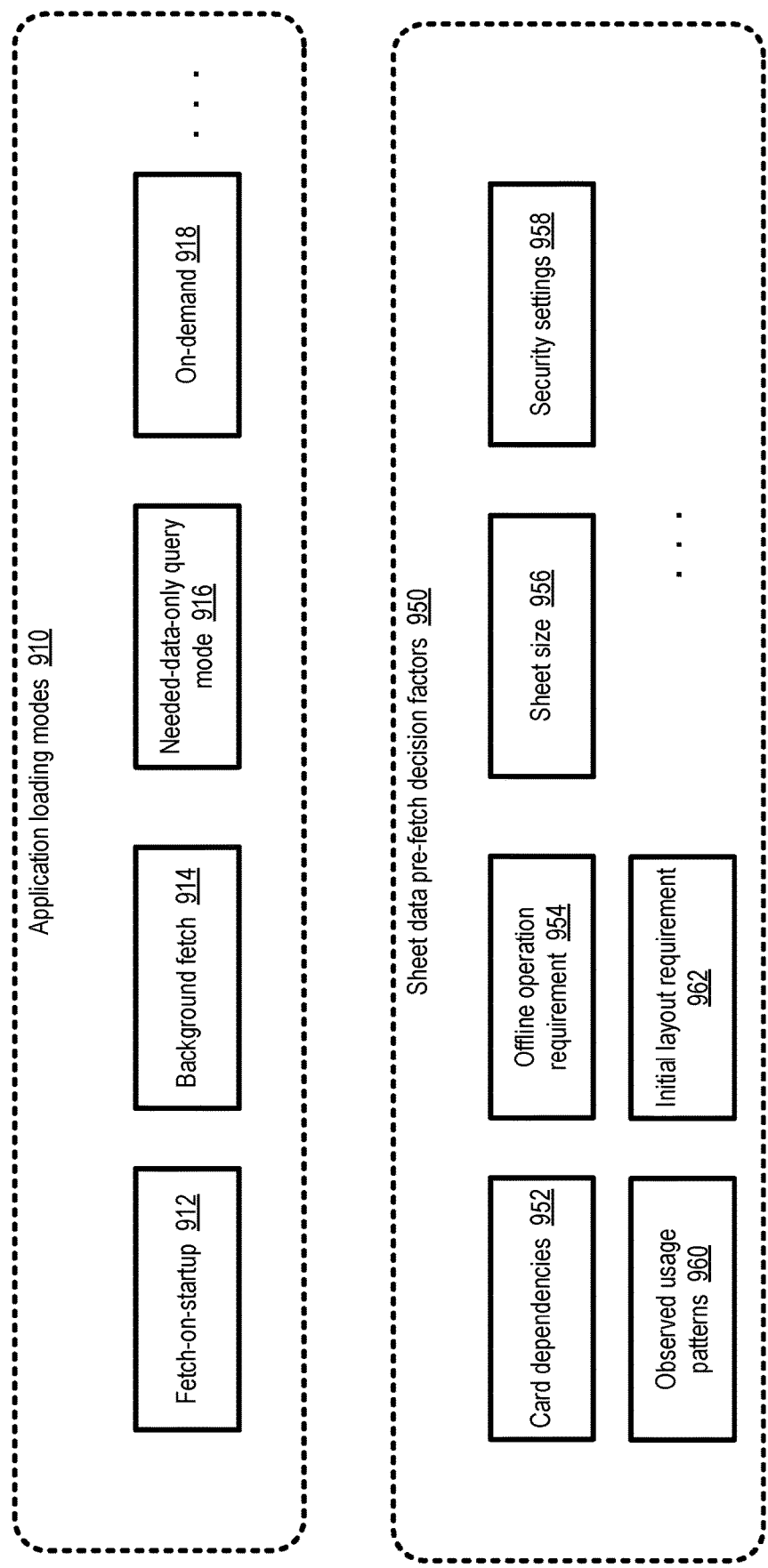
FIG. 9 illustrates examples of sheet data loading modes and factors influencing sheet pre-fetches for mobile applications, according to at least some embodiments.

FIG. 9 illustrates examples of application loading modes and factors influencing sheet pre-fetches for mobile applications, according to at least some embodiments. Four example modes 910 of loading the artifacts associated with a mobile application are shown: fetch-on-startup mode 912, background fetch mode 914, needed-data-only query mode 916 and on-demand mode 918. In fetch-on-startup mode 912, all the data sheets (and/or cards) needed for an application may be retrieved from the MAAS repositories only when the application is launched by the end user. In background fetch mode 914, at least some of the data sheets or cards may not immediately be retrieved upon startup; instead, the retrieval of some sheets/cards from the MAAS may be performed as a background operation after the application is launched. In needed-data-only query mode 916, the application may query the MAAS to retrieve only the specific data sheets or cards needed for the next stage of the application's workflow. In on-demand mode 918, the running application may issue a request to the MAAS for all the data sheets (including some that may not be needed immediately) and/or cards.

For those loading modes that support prefetching of data (such as background fetch mode), a number of factors may be taken into account in various embodiments to determine which subset of the data should be prefetched and when. The dependencies 952 of specific cards of the application on particular data sheets may influence such decisions, as well as whether the user has a requirement 954 for an offline or disconnected mode of operation. The sizes 956 of individual sheets (e.g., relative to the memory available at the targeted mobile device) may be taken into account, as well as the security settings 958 controlling access to individual data sheets or portions of data sheets. Observed usage patterns 960 of the application on a particular mobile device—e.g., how often respective features of the application are utilized—may be taken into account when deciding which subsets of the application data are to be pre-loaded in some embodiments. In order to improve the initial interactions of the user with the application, it may be helpful to ensure that the set of data sheets that are used for the initial layout requirement 962 of the application are prefetched automatically in various embodiments.

In various embodiments, a card dependency graph may be constructed at the MAAS for a given application, indicating for example which layouts/cards lead to which other layouts/cards during the execution of the application by an end user. Similarly, data sheet dependency graphs may also be created, indicating the sequences in which sheet data may be accessed. In some embodiments, the collection of sheets associated with a given application may be segmented or subdivided at the MAAS, e.g., based on the application's card dependency graph and personalization or assigned permissions of the sheets, and respective subsets of the collection may be loaded or pre-fetched together. Large data sheets may be paginated before transmission to target deployment devices in some embodiments. Other pre-fetch decision factors and other loading modes than those shown in FIG. 9 may be used in various embodiments. In some embodiments, for at least some types of target devices pre-fetching of sheet data may not be performed.

Provider Network Environment

Figure 10:
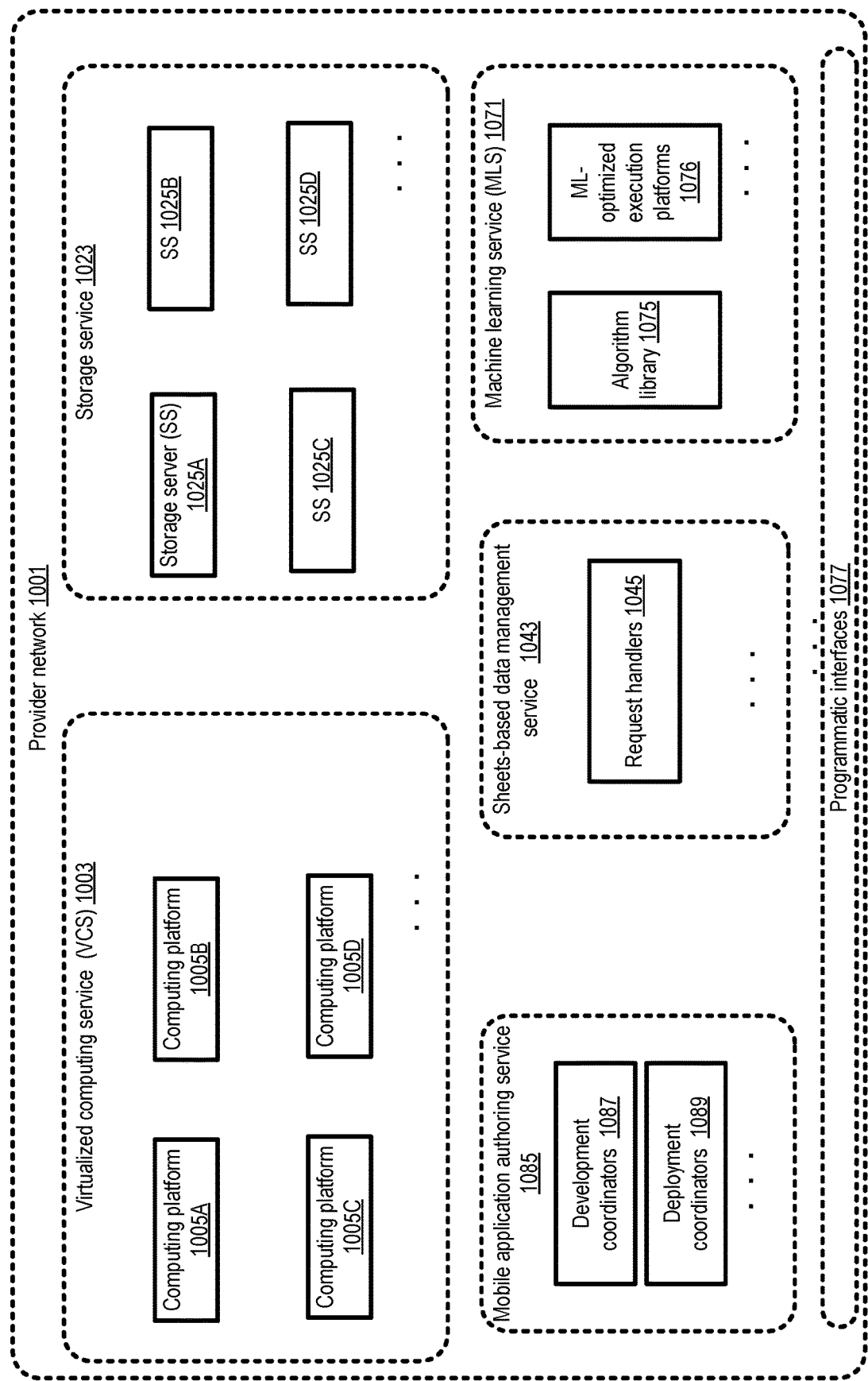
FIG. 10 illustrates an example provider network environment in which a mobile application authoring service may be implemented, according to at least some embodiments.

As mentioned earlier, in some embodiments a mobile application authoring service may be implemented as part of a provider network. FIG. 10 illustrates an example provider network environment in which a mobile application authoring service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 1001 may comprise resources used to implement a plurality of services, including for example a virtual computing service 1003, a storage service 1023, a machine learning service 1071, a sheets-based data management service 1043, and a mobile application authoring service 1085. Components of a given service may utilize components of other services in the depicted embodiment—e.g., for some machine learning tasks, a component of the machine learning service 1071 may utilize virtual machines implemented at computing platforms such as 1005A-1005D of the virtualized computing service, the raw data and/or metadata for various data sheets managed using the data management service 1043 may be stored at storage servers 1025 (e.g., 1025A-1025D) of storage service 1023, card-related metadata of the mobile application authoring service 1085 may be stored at storage service and so on. Individual ones of the services shown in FIG. 10 may implement a respective set of programmatic interfaces 1077 which can be used by external and/or internal clients (where the internal clients may comprise components of other services) in the depicted embodiment. In some embodiments, the sheets-based data management service 1043 may be implemented as a subcomponent of the mobile application authoring service 1085.

As shown, the mobile application authoring service 10085 may comprise one or more development coordinators 1087 and one or more deployment coordinators 1089 in the depicted embodiment. The development coordinators 1087 may be responsible for enabling the types of interactions associated with online and offline development features discussed above, while the deployment coordinators 1089 may be responsible for transmitting applications post-development to targeted mobile devices, loading and pre-fetching the appropriate subsets of data to the devices, and so on in various embodiments. The sheets-based data management service 1043 may comprise, among other components, one or more request handlers 1045 in the depicted embodiment. The request handlers 1045 may respond to client-submitted requests, e.g., from the mobile authoring service 1085 or from other clients, enabling clients to create, populate, read, modify and delete various types of data sheets including sheets arranged in hierarchies and sheets with links to groups of cells as discussed earlier.

The mobile application authoring service 1085 may interact with one or more other services of the provider network in various ways in the depicted embodiment. For example, resources of other services, such as request handlers 1045, computing platforms 1005 or storage servers 1025 may be used to perform some of the operations involved in application development, and/or to store application data or metadata. The storage service 1023 and/or the VCS 1003 may each provide high levels of availability, data durability, and failure resilience, enabling workloads associated with numerous concurrent sets of application authoring projects to be handled in various embodiments. In addition, in at least some embodiments, the mobile applications developed at the service may be used to invoke processes or operations from other services—e.g., when an end user interacts with a particular layout element of an application, a service request may be transmitted to one or more other services of the provider network. In one embodiment, in response to determining that a particular cell of a sheet associated with a mobile application has been updated from a mobile computing device, a process may be instantiated, updated or terminated at a provider network service other than the MAAS itself.

In at least one embodiment, at least some of the techniques discussed above for authoring and deploying mobile applications based on a web-of-sheets data model may be accomplished using non-specialized computing platforms (e.g., virtual machines) of the virtualized computing service 1003. In some embodiments, the techniques for authoring and deploying mobile applications may be implemented without acquiring resources of network-accessible services such as those shown in FIG. 10. For example, a standalone tool implemented at one or more computing devices which are not part of a network-accessible service may be used in some embodiments.

Methods for Enabling Mobile Application Authoring

Figure 11:
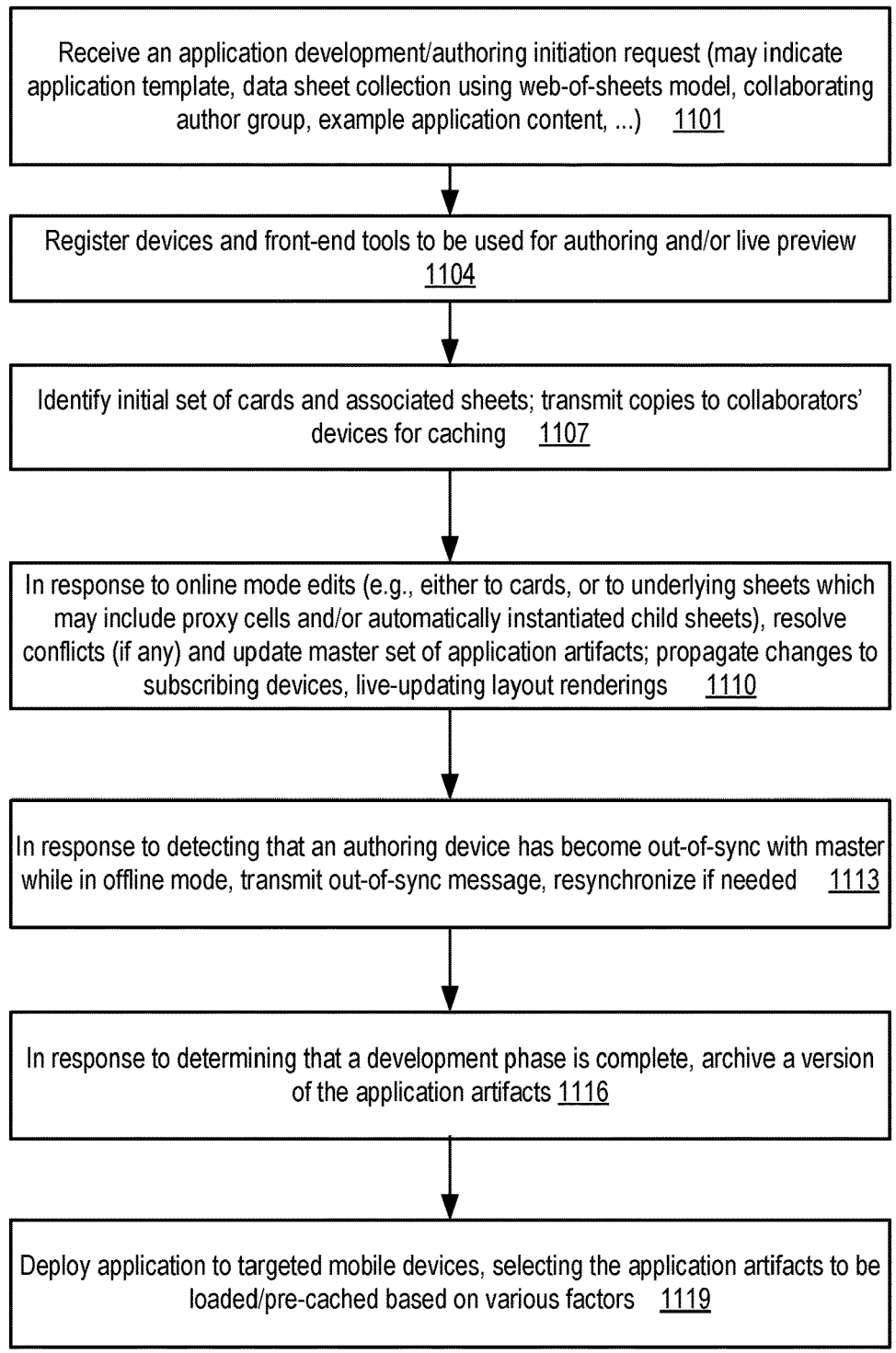
FIG. 11 is a flow diagram illustrating aspects of operations that may be performed to support authoring of mobile applications using a web-of-sheets data model, according to at least some embodiments.

FIG. 11 is a flow diagram illustrating aspects of operations that may be performed to support authoring of mobile applications using a web-of-sheets data model, according to at least some embodiments. As shown in element 1101, an application development or authoring initiation request may be received, e.g., at one or more computing devices of a network-accessible mobile application authoring service (MAAS). The request may, for example, indicate a particular application template selected from a MAAS template library, which is to be used as the starting point of the application. In some embodiments, the request may also indicate a collection of one or more data sheets instantiated in accordance with the web-of-sheets data model (which supports automated instantiation of child sheets, as well as the use of proxy cells to access associated cells). The sheet collection may, for example, include a set of child sheets of a parent sheet and one or more sheets containing proxy cells. In some embodiments, the request may also indicate a group of collaborating authors who are going to work together on the application being developed, and the permissions granted to various members of the group. In one embodiment, instead of or in addition to specifying a collection of data sheets, examples of application content (e.g., photographs, calendar entries, contact entries and the like) may be provided to the MAAS, enabling the MAAS to generate at least a preliminary set of data sheets for the application.

In some embodiments, a plurality of devices may be used to develop, preview and interact with the mobile application. Such devices or the corresponding front-end tools may be registered at the MAAS (element 1104) as authorized devices to which application artifacts may be transmitted based on the permissions granted to various collaborating authors with which the devices are associated.

An initial set of one or more cards and associated data sheets may be identified for the application (element 1107), e.g., based on the information provided in the authoring initiation request. An individual card may represent one or more layout items of a screen layout of the application, where the contents of at least some of the layout items may be based on the contents of one or more data sheets. In some cases, an empty card and/or an empty sheet may be created by the service. Respective copies of the cards and/or sheets may be transmitted to, and cached at, at least some of the devices to be used for application authoring and/or previewing in the depicted embodiment.

Individual ones of the application authors may then proceed to develop the application via one or more editing or authoring sessions, either in online mode (during which connectivity is maintained with the MAAS), in offline mode (without maintaining connectivity with the MAAS), or in a sequence of online and offline sessions. In response to online mode edits directed at application cards or the underlying data sheets, a master set of the corresponding application artifacts maintained at the MAAS may be updated in real time (element 1110). The updates made to the application may be reflected at the front-end tool from which the edits were made, and also propagated in real time to the set of subscribed devices registered to receive notifications of application updates. For example, at the source front-end tool or authoring interface, an updated representation of a particular card which was edited may be displayed, while a screen layout corresponding to the updated representation may be rendered at a particular mobile computing device designated as a live interaction environment for the mobile application.

During an optional offline authoring session, an author may create a version of the application which diverges from the master version in various embodiments, using the locally-cached cards and/or data sheets. In response to detecting that the application artifacts (e.g., cards and/or data sheets) at an authoring device have become out-of-sync with the master version while in offline mode, and out-of-sync message may be transmitted to the device in at least some embodiments (element 1113). The local version and the master version may be resynchronized if needed, e.g., using any of a variety of conflict resolution techniques if any conflicts are detected by the MAAS in some embodiments.

A number of characteristics of the application authoring system described herein may make the authored applications more robust with regard to changes in the underlying data sheets in various embodiments, and may therefore help with resynchronization after multiple authors have independently modified the applications or associated data sheets. Because of the way that metadata and data is in effect stored together in the web-of-sheets data model, it may be easier to automatically detect whether a given change to a data sheet is likely to break (i.e., lead to a failure or undesired behavior at) one or more applications built using that data sheet. In at least some embodiments, within the cards which make up an application, unique and immutable identifiers may be used to refer to sheet rows, columns and/or expressions (e.g., filter expressions of the kind mentioned above). At run time, after an application is deployed in such embodiments, the logic of the application may often not be disrupted even if some types of structural changes are made to the sheets themselves, such as adding new rows or columns. This level of robustness may be attained because the identifiers used in the application would continue to refer to the same data despite the change in the absolute coordinates of the data within the sheets. Of course, some types of changes to the underlying data sheets may disrupt or break applications in various embodiments—e.g., if a set of cells referenced in the application were deleted, or an entire sheet were deleted. In some embodiments, any of various resynchronization techniques may be implemented during the authoring or development phase of an application to deal with conflicts which may result from independent offline edits from multiple authors. For example, a "last-writer-wins" approach may be taken in one embodiment, in which if conflicts are detected between the changes made by two authors, the changes which were made most recently are accepted. An another embodiment, a "diff-and-merge" approach may be taken, in which the specific differences between the versions created by different authors may be identified and then the changed portions may be merged to the extent possible.

In response to determining that a development phase of the mobile application is complete, a version of the application artifacts may be archived at a MAAS repository (element 1116) in the depicted embodiment. After the application has been tested and approved for deployment, in various embodiments the application may be deployed to targeted mobile devices (element 1119) in various embodiments. Author-selected or MAAS-selected policies may be used to select the subset of application artifacts that are to be pre-loaded, and the loading modes to be used, in various embodiments.

It is noted that in various embodiments, some of the operations shown in FIG. FIG. 11 may be implemented in a different order than that shown in the figure, or may be performed in parallel rather than sequentially. Additionally, some of the operations shown in FIG. 11 may not be required in one or more implementations.

Use Cases

The techniques described above, of supporting mobile application authoring simple, easy to use tools using a cards-based framework and an underlying web-of-sheets data model may be useful in a variety of scenarios. Numerous small business owners who are not experts in software development or traditional database techniques may for example be able to generate customized applications by accessing a service implementing the techniques. The use of the familiar spreadsheet-like data sheets interfaces, and the live propagation of updates without perceptible delays for application compilation and build phases, may considerably simplify the task of application authoring. Authors may use offline modes of application development to try out variants of a baseline application; in effect, each application author may be able to experiment with the application based on their specific needs, and synchronize their local application versions with a master version if and when desired. A large population of individuals and organizations may be able to develop and deploy mobile applications easily, without having to write source code.

Illustrative Computer System

Figure 12:
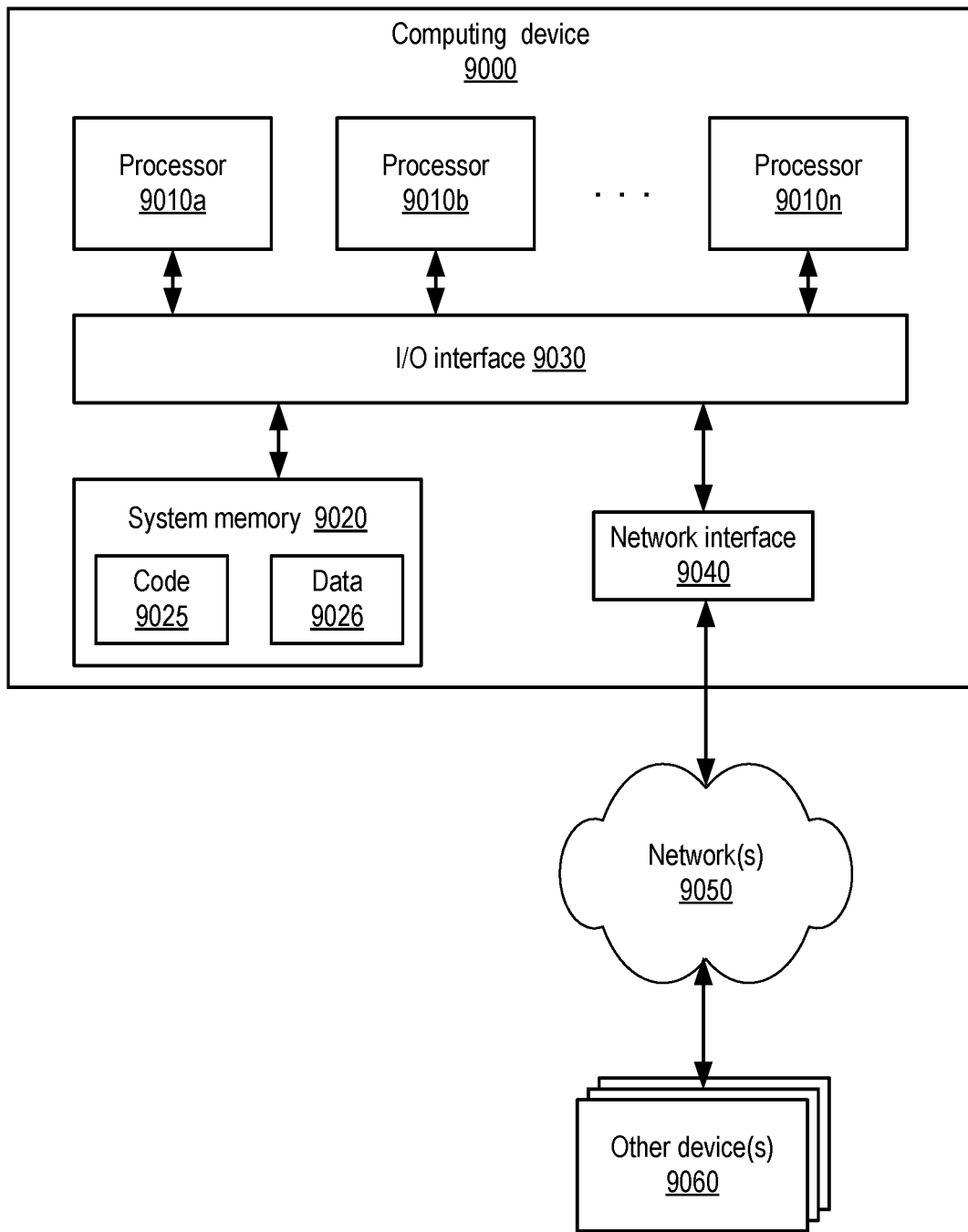
FIG. 12 is a block diagram illustrating an example computing device that may be used in at least some embodiments.

In at least some embodiments, a server that implements a portion or all of one or more of the technologies described herein, including the techniques for authoring and deploying applications, creating and modifying cards, data sheets and the like may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of an application authoring service;
   wherein the one or more computing devices include instructions that upon execution on a processor cause the one or more computing devices to:
   determine that a particular mobile computing device is designated as a live previewing and editing environment for an application;
   cause respective representations of at least (a) one or more cards and (b) an expanded view of a particular card of the one or more cards to be displayed via a first application authoring interface, wherein individual ones of the one or more cards represent respective sets of one or more screen layouts of the application, wherein displayed contents of the particular card are based at least in part on contents of a child data sheet of a cell of a parent data sheet of a data sheet collection, wherein the data sheet collection is organized according to a data model which supports (a) automated instantiation of child data sheets and (b) referencing of contents of one or more cells of a particular data sheet via a proxy cell;
   in response to detecting an edit operation directed at a particular screen layout represented by the particular card,
   update the representation of the particular card according to the edit operation to the particular screen layout;
   store a result of the edit operation at a repository associated with the application authoring service;
   cause the updated representation of the particular card according to the edit operation to be displayed at the first application authoring interface; and
   cause the particular screen layout corresponding to the updated representation according to the edit operation to be rendered at the particular mobile computing device.

2. The system as recited in claim 1, wherein the instructions upon execution on a processor cause the one or more computing devices to:
   determine that an application authoring initiation request indicating a particular data sheet has been submitted; and
   in response to the application authoring initiation request,
   store one or more metadata records indicating (a) that the particular card represents a screen layout of the application and (b) an association between the particular card and the particular data sheet; and
   cause the representation of the particular card to be displayed via the first authoring interface.

3. The system as recited in claim 2, wherein the application authoring initiation request indicates a first application template, wherein the instructions upon execution on a processor cause the one or more computing devices to:
   identify, based at least in part on the first application template, the particular card.

4. The system as recited in claim 1, wherein a particular layout item of the particular card comprises one or more of: (a) a content container comprising a combination of text and one or more card cells, wherein at least one card cell of the one or more card cells is associated with a cell of a data sheet, (b) a data entry form, (c) a repeater configured to iterate over individual rows of at least a portion of a data sheet, (d) a map, (e) a calendar entry, (f) a chart, (g) an image, or (h) a video.

5. The system as recited in claim 1, wherein the instructions upon execution on a processor cause the one or more computing devices to:
   receive a request, via the first application authoring interface, to bind a repeater layout item of the particular card to at least a first proxy cell of a first sheet of the collection of data sheets, wherein the first proxy cell has an associated filter expression;
   retrieve, from the first sheet, contents of one or more cells in accordance with the filter expression; and
   cause a portion of a screen layout to be displayed, comprising (a) at least a subset of the contents of the one or more cells and (b) an interface to iterate over the subset of the contents.

6. A method, comprising:
performing, by one or more computing devices:
    causing respective representations of at least one or more cards to be displayed via a first application authoring interface, wherein individual ones of the one or more cards represent respective sets of one or more screen layouts of an application being authored, wherein displayed contents of a particular card of the one or more cards are based at least in part on contents of a particular data sheet for which a proxy cell in another data sheet has been designated;
    in response to detecting an edit operation directed at a screen layout represented by the particular card,
        updating the representation of the particular card according to the edit operation to the screen layout;
        causing the updated representation of the particular card according to the edit operation to be displayed at the first application authoring interface; and
        causing the screen layout corresponding to the updated representation according to the edit operation to be rendered at a particular mobile computing device designated as a live interaction environment for the application.

7. The method as recited in claim 6, further comprising performing, by the one or more computing devices:
    receiving, via a programmatic interface, an application authoring initiation request indicating a particular data sheet; and
    in response to the application authoring request,
        storing one or more metadata records indicating (a) that the particular card represents a screen layout of the application and (b) an association between the particular card and the particular data sheet; and
        causing the representation of the particular card to be displayed via the first application authoring interface.

8. The method as recited in claim 7, wherein the application authoring initiation request indicates a first application template selected from a plurality of templates accessible from a network-accessible service, the method further comprising performing, by the one or more computing devices:
    identifying, based at least in part on the first application template, the particular card.

9. The method as recited in claim 8, wherein a particular layout item of the particular card comprises one or more of: (a) a content container comprising a combination of text and one or more card cells, wherein at least one card cell of the one or more card cells is associated with a cell of a data sheet, (b) a data entry form, (c) a repeater which iterates over individual rows of at least a portion of a data sheet, (d) a map, (e) a calendar entry, (f) a chart, (g) an image, or (h) a video.

10. The method as recited in claim 6, further comprising performing, by the one or more computing devices:
    causing at least a portion of content of the one or more data sheets to be cached at the particular mobile computing device; and
    in response to determining that a request to modify the application has been generated from the particular mobile device, modifying at least one local version of a first card at the particular mobile computing device, wherein the first card displays data obtained from a cached version of a first data sheet of the one or more data sheets.

11. The method as recited in claim 6, further comprising performing, by the one or more computing devices:
    synchronizing a local version of the application with a master version of the application, wherein the local version is generated at the particular mobile computing device, and wherein the master version is stored in a repository.

12. The method as recited in claim 6, further comprising performing, by the one or more computing devices:
    providing a programmatic indication that a local version of the application is not synchronized with a master version of the application, wherein the local version is generated at the particular mobile computing device.

13. The method as recited in claim 6, further comprising performing, by the one or more computing devices:
    in response to determining that a particular cell of a first sheet associated with the application has been updated from the mobile computing device, causing a process to be instantiated, updated or terminated at a provider network.

14. The method as recited in claim 6, further comprising performing, by the one or more computing devices:
    receiving an indication of a first target deployment platform of the application;
    causing a first version of a layout of the particular card to be displayed at one or more devices, wherein the first version is customized for the first target deployment platform; and
    in response to receiving an indication of a second target deployment platform of the application, causing a second version of the layout of the particular card to be displayed at one or more devices, wherein the second version is customized for the second target deployment platform.

15. The method as recited in claim 6, further comprising performing, by the one or more computing devices:
    receiving a registration request for automated propagation of updates of the application, wherein the updates are performed in response to programmatic interactions with one or more application authors;
    transmitting, to a particular application authoring device indicated in the registration request, a first updated version of the application.

16. A non-transitory computer-accessible storage medium storing program instructions that when executed on one or more processors cause the one or more processors to:
    cause respective representations of at least one or more cards to be displayed via a first application authoring interface, wherein individual ones of the one or more cards represent respective sets of one or more screen layouts of an application being authored, wherein displayed contents of a particular card of the one or more cards are based at least in part on contents of one or more data sheets stored at a repository;
    in response to detecting an edit operation directed at a particular screen layout represented by the particular card,
        update the representation of the particular card according to the edit operation to the screen layout;
        cause the updated representation of the particular card according to the edit operation to be displayed at the first application authoring interface; and
        cause the screen layout corresponding to the updated representation according to the edit operation to be rendered at a particular mobile computing device designated as a live interaction environment for the mobile application.

17. The non-transitory computer-accessible storage medium as recited in claim 16, wherein the instructions when executed on one or more processors cause the one or more processors to:

determine a sheet loading mode of the application, wherein the sheet loading mode comprises one or more of: (a) a fetch-on-startup mode, (b) a background fetch mode, (c) a needed-data-query mode, or (d) an on-demand mode; and cause a representation of at least a portion of the one or more data sheets to be transmitted to one or more mobile devices in accordance with the sheet loading mode.

18. The non-transitory computer-accessible storage medium as recited in claim 16, wherein the instructions when executed on one or more processors cause the one or more processors to:

determining a pre-fetch mode with respect to a particular data sheet of the application, wherein the pre-fetch mode is based at least in part on one or more of: (a) a dependency of a particular card of the application on the particular sheet, (b) an offline operation requirement, (c) a size of the particular sheet, (d) a security setting, (e) a determination whether the particular sheet is used for an initial layout of the application, or (f) an observed usage pattern; and cause a representation of at least a portion of the particular data sheet to be transmitted to one or more mobile devices in accordance with the pre-fetch mode.

19. The non-transitory computer-accessible storage medium as recited in claim 16, wherein the instructions when executed on one or more processors cause the one or more processors to:

store a portion of program source code to be used to populate at least one layout item of a particular screen layout of the application, wherein the portion of program source code is submitted via a programmatic interface.

20. The non-transitory computer-accessible storage medium as recited in claim 16, wherein the instructions when executed on one or more processors cause the one or more processors to:

store, in a repository, a persistent version of the particular card, wherein the persistent version is formatted according to a markup language; and transmit, to one or more computing devices being used for authoring the application, a respective copy of the persistent version of the particular card.

* * * * *